(12) United States Patent  
Zur

(10) Patent No.: US 6,310,358 B1
(45) Date of Patent: Oct. 30, 2001

(54) X-RAY IMAGING SYSTEM

(75) Inventor: Albert Zur, Ganei Tikya (IL)

(73) Assignee: Edge Medical Devices Ltd., Raanana (IL)

( * ) Notice: Subject to any disclaimer, the term of this patent is extended or adjusted under 35 U.S.C. 154(b) by 0 days.

(21) Appl. No.: 09/233,320

(22) Filed: Jan. 20, 1999

(30) Foreign Application Priority Data

Jan. 20, 1998 (IL) .......................................... 123006

(51) Int. Cl.[7] .................................................. G01N 23/04
(52) U.S. Cl. ........................ 250/591; 250/585; 250/338.4
(58) Field of Search .................................. 250/591, 585, 250/338.4

(56) References Cited

U.S. PATENT DOCUMENTS

| | | |
|---|---|---|
| 4,079,255 | 3/1978 | Brueckner et al. . |
| 4,176,275 | 11/1979 | Korn et al. . |
| 4,539,591 | 9/1985 | Zermeno et al. . |
| 4,961,209 | 10/1990 | Rowlands et al. . |
| 4,975,935 | 12/1990 | Hillen et al. . |
| 4,998,266 | 3/1991 | Hillen et al. . |
| 5,023,455 | 6/1991 | Vanstraelen . |
| 5,059,794 | 10/1991 | Takahashi et al. . |
| 5,077,765 | 12/1991 | Hillen et al. . |
| 5,093,851 | 3/1992 | Schafer . |
| 5,097,493 | 3/1992 | Hillen et al. . |
| 5,117,114 | 5/1992 | Street et al. . |
| 5,153,423 | 10/1992 | Conrads et al. . |
| 5,164,809 | 11/1992 | Street et al. . |
| 5,184,018 | 2/1993 | Conrads et al. . |
| 5,196,702 * | 3/1993 | Tsuji et al. ............................. 250/591 |
| 5,230,927 | 7/1993 | Nishizawa et al. . |
| 5,268,569 | 12/1993 | Nelson et al. . |
| 5,280,512 | 1/1994 | Maack et al. . |
| 5,332,893 | 7/1994 | Potts et al. . |
| 5,341,409 | 8/1994 | Conrads et al. . |
| 5,354,982 | 10/1994 | Nelson et al. . |
| 5,369,268 | 11/1994 | Van Aller et al. . |
| 5,396,072 | 3/1995 | Schiebel et al. . |
| 5,436,101 | 7/1995 | Fender et al. . |
| 5,440,146 | 8/1995 | Steffen et al. . |
| 5,467,378 | 11/1995 | Lumma et al. . |
| 5,508,507 | 4/1996 | Nelson et al. . |
| 5,510,626 | 4/1996 | Nelson et al. . |
| 5,519,750 | 5/1996 | Heinemann et al. . |
| 5,528,043 | 6/1996 | Spivey et al. . |
| 5,530,238 | 6/1996 | Meulenbrugge et al. . |
| 5,563,421 | 10/1996 | Lee et al. . |
| 5,567,929 | 10/1996 | Ouimette . |
| 5,602,889 | 2/1997 | Oldendorf et al. . |
| 5,637,882 * | 6/1997 | Divigalpitiya et al. .............. 250/591 |
| 5,652,430 | 7/1997 | Lee . |
| 5,686,732 | 11/1997 | Lumma . |
| 5,723,866 | 3/1998 | Hamilton, Jr. . |

(List continued on next page.)

*Primary Examiner*—Constantine Hannaher
*Assistant Examiner*—Andrew Israel
(74) *Attorney, Agent, or Firm*—Pillsbury Winthrop LLP

(57) ABSTRACT

The present disclosure presents an apparatus for radiation detection comprising a generally uniform dielectric layer, a conductive layer interfacing a first surface of the generally uniform dielectric layer; an ionizing radiation detection multi-layer structure including a photoelectric conversion layer interfacing a second surface of the generally uniform dielectric layer; said ionizing radiation detection multi-layer structure, said generally uniform dielectric layer, and said conductive layer being configured with respect to each other and being operative such that an imagewise ionizing radiation pattern impinging on said ionizing radiation detection multi-layer substrate causes a corresponding charge pattern representing said imagewise ionizing radiation to be generated at the interface between the generally uniform dielectric layer and the photoelectric conversion layer and causes a readable imagewise replica of said charge pattern to be formed in said conductive layer.

41 Claims, 13 Drawing Sheets

U.S. PATENT DOCUMENTS

| | | |
|---|---|---|
| 5,729,021 | 3/1998 | Brauers et al. . |
| 5,773,839 | 6/1998 | Krepel et al. . |
| 5,812,191 | 9/1998 | Orava et al. . |
| 5,818,052 | 10/1998 | Elabd . |
| 5,818,053 | 10/1998 | Tran . |
| 5,844,243 | 12/1998 | Lee et al. . |
| 5,895,936 * | 4/1999 | Lee .................................. 250/591 |

* cited by examiner

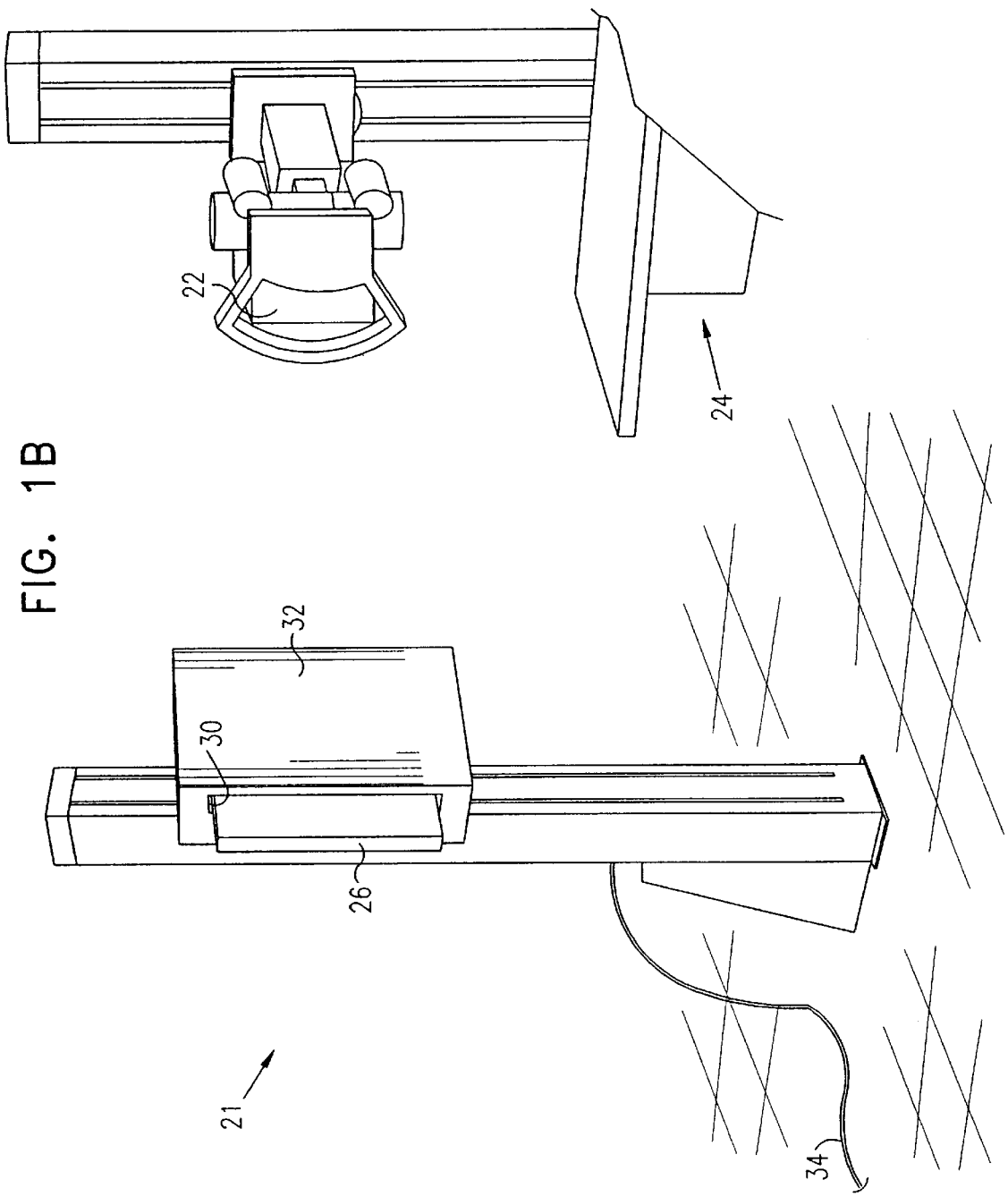

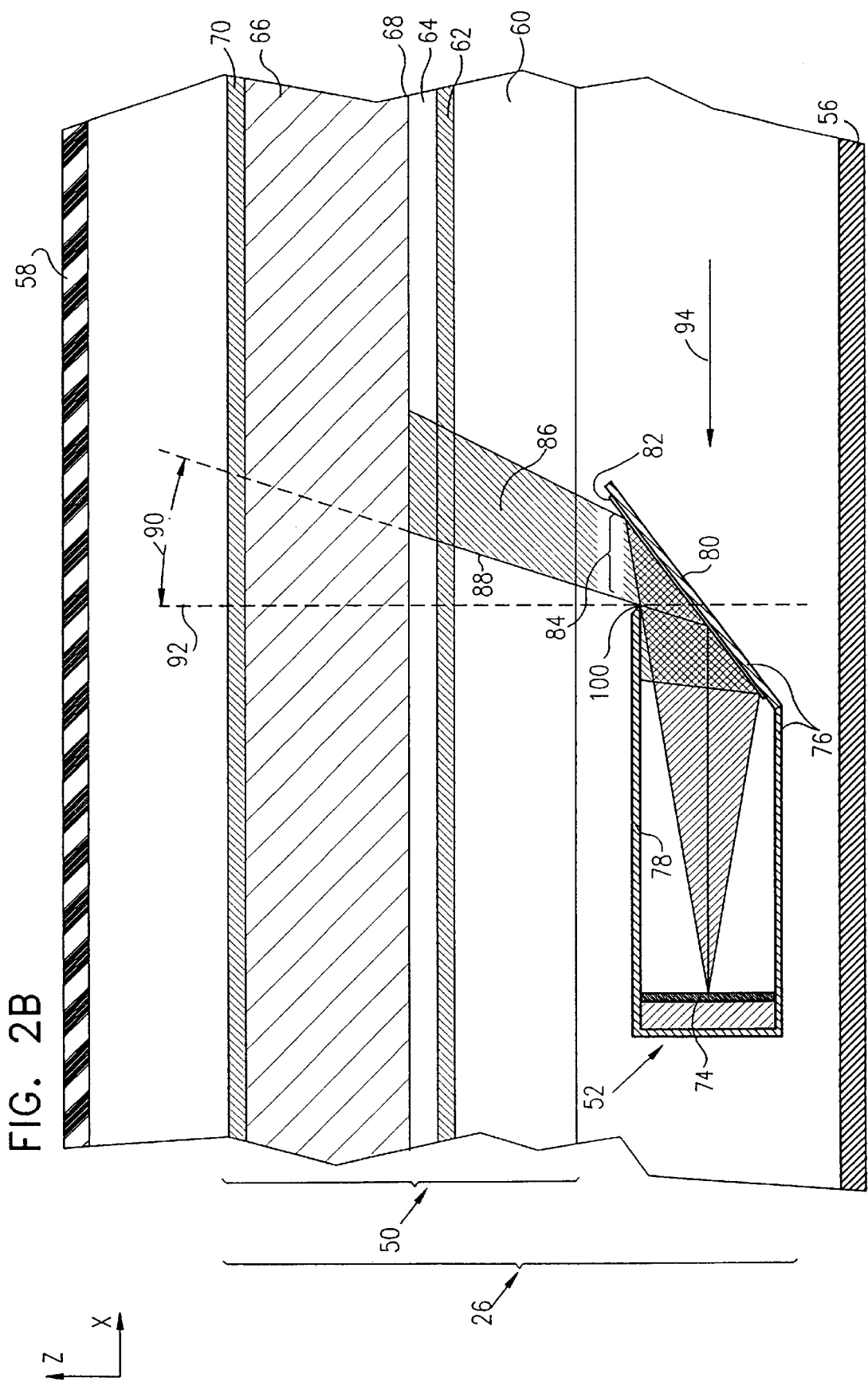

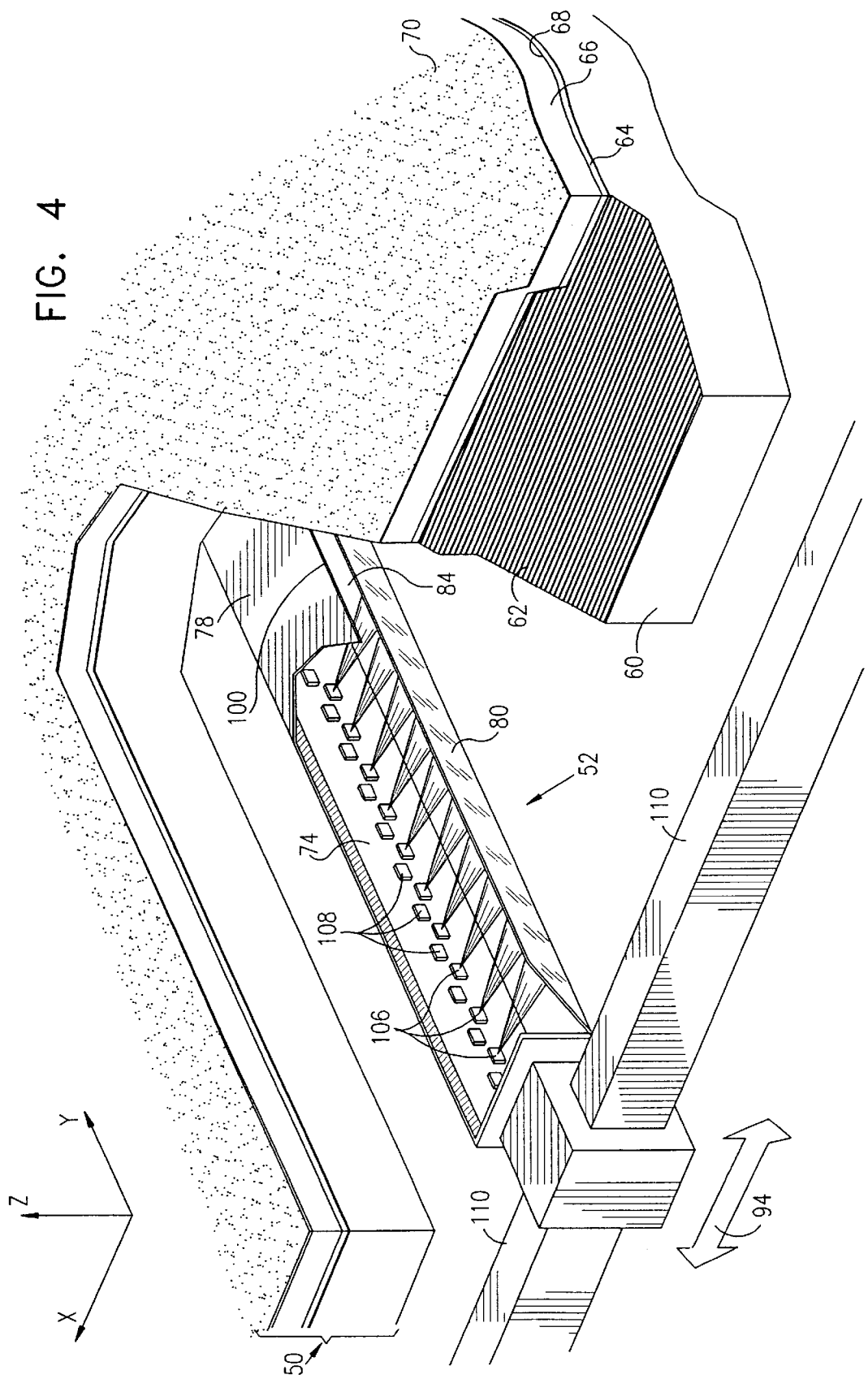

X-RAY IMAGING SYSTEM

FIELD OF THE INVENTION

The present invention relates to apparatus and methods for detecting ionizing radiation images and more specifically relates to apparatus and methods for digital detection of x-ray images.

BACKGROUND OF THE INVENTION

There are described in the patent literature numerous systems and methods for the recording of X-ray images. Conventional X-ray imaging systems use an X-ray sensitive phosphor screen and a photosensitive film to form visible analog representations of modulated X-ray patterns. The phosphor screen absorbs X-ray radiation and is stimulated to emit visible light. The visible light exposes photosensitive film to form a latent image of the X-ray pattern. The film is then chemically processed to transform the latent image into a visible analog representation of the X-ray pattern.

Recently, there have been proposed systems and methods for detection of X-ray images in which the X-ray image is directly recorded as readable electrical signals, thus obviating the need for film in the imaging process.

For example, U.S. Pat. No. 4,961,209 to Rowlands et al describes a method for employing a transparent sensor electrode positioned over a photoconductive layer and a pulsed laser that scans the photoconductive layer through the transparent sensor electrode.

U.S. Pat. No. 5,268,569 to Nelson et al. describes an imaging system having a photoconductive material which is capable of bearing a latent photostatic image, a plurality of elongate parallel strips adjacent the photoconductive material, and a pixel source of scanning radiation.

U.S. Pat. No. 5,652,430 to Lee describes a radiation detection panel for X-ray imaging systems which is made up of a matrix assembly of radiation detection sensors arrayed in rows and columns to record still or moving images.

Examples of commercially available systems in which X-ray images are directly recorded as readable electrical signals include the Direct Radiography line of detector arrays offered by Sterling Diagnostic Imaging (formerly DuPont) of Delaware, USA; the Pixium line of flat panel X-ray detectors for radiography offered by Trixell of Moirans, France; the Digital Imaging Center offered by Swissray Medical AG of Switzerland; and the Canon Digital Radiography System offered by the Canon Medical Division of Canon U.S.A.

In addition, digital mammographic x-ray systems are commercially available. For example, the Opdima system offered by Siemens Medical Systems, Inc. of New Jersey, USA.

SUMMARY OF THE INVENTION

The present invention seeks to provide an improved X-ray imaging system and method.

There is thus provided in accordance with a preferred embodiment of the present invention a radiation detection module including a generally uniform dielectric layer with generally opposite first and second surfaces, a conductive layer interfacing the first surface of the generally uniform dielectric layer, an ionizing radiation detection multi-layer structure including a photoelectric conversion layer which interfaces the second surface of the generally uniform dielectric layer; the conductive layer, the ionizing radiation detection multi-layer structure and the generally uniform dielectric layer being configured and arranged with respect to each other and being operative such that an imagewise ionizing radiation pattern impinging on the ionizing radiation detection multi-layer structure causes a corresponding charge pattern representing the imagewise ionizing radiation pattern to be generated at the interface between the generally uniform dielectric layer and the photoelectric conversion layer and also causes a readable imagewise replica of the charge pattern to be formed in the conductive layer.

Further in accordance with a preferred embodiment of the present invention, the photoelectric conversion layer of the ionizing radiation detection multi-layer structure converts radiation to charge carriers and the ionizing radiation detection multi-layer structure also includes a continuous electrode disposed over the photoelectric conversion layer.

Still further in accordance with a preferred embodiment of the present invention the ionizing radiation detection multi-layer structure includes a barrier or blocking layer disposed between said continuous electrode and said photoelectric layer.

Additionally in accordance with a preferred embodiment of the present invention the photoelectric conversion layer is selenium or a selenium alloy. Alternately, in accordance with a preferred embodiment of the present invention, the photoelectric conversion layer is lead oxide, thallium bromide, cadmium telluride, cadmium zinc telluride, cadmium sulfide or mercury iodide.

In yet further accordance with a preferred embodiment of the present invention, the ionizing radiation detection multi-layer structure also includes a scintillator which absorbs ionizing radiation and emits optical radiation and a continuous electrode which is generally transparent to optical radiation, disposed between the scintillator and the photoelectric conversion layer.

Still in further accordance with a preferred embodiment of the present invention, an optically transparent barrier layer is disposed between the continuous electrode and the photoelectric conversion layer.

Additionally in accordance with a preferred embodiment of the present invention, the scintillator is either cesium iodide or a doped version thereof.

Preferably, the photoelectric conversion layer is amorphous selenium, a selenium alloy or amorphous silicon. Alternately, the photoelectric conversion layer may be an organic photoconductor.

In further accordance with a preferred embodiment of the present invention, the radiation detection module includes an optical radiation source which scans at least part of the conductive layer. Furthermore, the conductive layer and the dielectric layer are preferably transparent to optical radiation.

Moreover, in accordance with a preferred embodiment of the present invention, the optical radiation source includes at least one source of optical radiation which impinges on but does not pass entirely through the photoelectric conversion layer.

In still further accordance with a preferred embodiment of the present invention, the optical radiation source also includes a second source of optical radiation, which generally passes through the photoelectric conversion layer.

Preferably the optical radiation source is a generally linear array of light emitting diodes that emits a generally elongate beam of optical radiation.

Furthermore, in accordance with a preferred embodiment of the present invention, the elongate beam of optical radiation has at least one well-defined edge.

Additionally, in accordance with a preferred embodiment of the present invention, readout electronics are coupled to the conductive layer to sense an electric current flowing therealong as the optical radiation source scans the conductive layer and as the optical radiation source is operative.

In accordance with a preferred embodiment of the present invention, the readout electronics are removably coupled to the conductive layer. Alternately, in accordance with a preferred embodiment of the present invention, the readout electronics may be permanently coupled to the conductive layer.

Preferably, the ionizing radiation is x-ray radiation.

There is also provided in accordance with a preferred embodiment of the present invention an addressable array of radiation detection elements including a multi-layer radiation sensor, a plurality of electronically addressable optically transparent conductive columns associated with the multi-layer radiation sensor, readout electronics coupled to the plurality of electronically addressable, optically transparent conductive columns and a scanning source of optical radiation, projecting an elongate beam that transverses the conductive columns. The elongate beam, which is generally wider than a single row, scans the optically transparent conductive columns to provide sequential addressing of each row of the array of radiation detection elements.

In further accordance with a preferred embodiment of the present invention, the multi-layer radiation sensor includes a continuous electrode, a generally transparent dielectric layer and a photoelectric conversion layer which absorbs radiation and generates charge carriers, disposed between the continuous electrode and the generally transparent dielectric layer.

In still further accordance with a preferred embodiment of the present invention, the multi-layer radiation sensor includes a barrier layer disposed between the continuous electrode and the photoelectric conversion layer.

Additionally in accordance with a preferred embodiment of the present invention, the photoelectric conversion layer is selenium or a selenium alloy. Alternately the generally uniform radiation sensitive layer may be lead oxide, thallium bromide, cadmium telluride, cadmium zinc telluride, cadmium sulfide or mercury iodide.

Yet in further accordance with a preferred embodiment of the present invention, the radiation to be detected is ionizing radiation and the multi-layer radiation sensor is a layered stack including the following layer order: a scintillator, which absorbs ionizing radiation and emits optical radiation, a continuous electrode which is generally transparent to optical radiation, a photoelectric conversion layer which absorbs radiation and generates charge carriers and a continuous dielectric layer, which is generally transparent to optical radiation.

There is also provided in accordance with a preferred embodiment of the present invention an X-ray image detection module including a first electrical conductor, which is permeable to incident X-rays, a second electrical conductor, spaced from the first electrical conductor, an X-ray sensitive material disposed between the first and second electrical conductors, a dielectric layer disposed between the X-ray sensitive material and the second electrical conductor, the first and second mutually spaced electrical conductors, the X-ray sensitive material and the dielectric layer being configured and arranged with respect to each other and being operative such that imagewise X-ray radiation impinging on the X-ray sensitive material causes a corresponding imagewise replica of the imagewise X-ray radiation to be formed in the second electrical conductor.

Further in accordance with a preferred embodiment of the present invention the reader includes a radiation source which scans over at least part of the second electrical conductor.

Still further in accordance with a preferred embodiment of the present invention the radiation source includes at least one first source of radiation which impinges on but does not pass entirely through the X-ray sensitive material.

Additionally in accordance with a preferred embodiment of the present invention the radiation source also includes at least one second source of radiation which generally passes through the X-ray sensitive material.

Moreover in accordance with a preferred embodiment of the present invention the radiation source is an elongate light source.

Still further in accordance with a preferred embodiment of the present invention the elongate light source scans in a direction parallel to a longitudinal axis thereof.

Preferably, the reader includes read electronics coupled to the second electrical conductor for sensing an electric current flowing therealong as the radiation source scans over the second electrical conductor as the at least first radiation source is operative.

Further in accordance with a preferred embodiment of the present invention operation of the reader causes radiation to impinge on the X-ray sensitive material, with the result that the corresponding charge pattern therein generally uniformized, thereby causing a redistribution of charge therein, resulting in an electrical current flow along the second electrical conductor.

There is also provided in accordance with another preferred embodiment of the present invention an X-ray image detection system including an X-ray beam source, a subject support, a detection subsystem associated with the subject support and including a detection module support, a detection module disposed in the detection subsystem and including a first electrical conductor, which is permeable to incident X-rays, a second electrical conductor, spaced from the first electrical conductor, an X-ray sensitive material disposed between the first and second electrical conductors, a dielectric layer disposed between the X-ray sensitive material and the second electrical conductor, the first and second mutually spaced electrical conductors, the X-ray sensitive material and the dielectric layer being configured and arranged with respect to each other and being operative such that imagewise X-ray radiation impinging on the X-ray sensitive material causes a corresponding imagewise replica of the imagewise X-ray radiation to be formed in the second electrical conductor.

Moreover in accordance with a preferred embodiment of the present invention there is also provided a reader operative to read the imagewise replica of the imagewise X-ray radiation formed in the second electrical conductor.

Additionally in accordance with a preferred embodiment of the present invention the reader includes a radiation source which scans over at least part of the second electrical conductor.

Further in accordance with a preferred embodiment of the present invention the radiation source includes at least one first source of radiation which impinges on but does not pass entirely through the X-ray sensitive material.

Still further in accordance with a preferred embodiment of the present invention the radiation source additionally includes at least one second source of radiation which generally passes through the X-ray sensitive material.

Moreover in accordance with a preferred embodiment of the present invention the radiation source is an elongate light source.

Still further in accordance with a preferred embodiment of the present invention the elongate light source scans in a direction perpendicular to a longitudinal axis thereof.

Further in accordance with a preferred embodiment of the present invention the reader includes read electronics coupled to the second electrical conductor for sensing an electric current flowing therealong as the radiation source scans over the second electrical conductor as the at least first radiation source is operative.

Additionally in accordance with a preferred embodiment of the present invention operation of the reader causes radiation to impinge on the X-ray sensitive material, with the result that the corresponding charge pattern therein is generally uniformized, thereby causing a redistribution of charge therein, resulting in an electrical current flow along the second electrical conductor.

There is also provided in accordance with a preferred embodiment of the present invention an X-ray image detection method including the steps of providing a first electrical conductor, which is permeable to incident X-rays, a second electrical conductor, spaced from the first electrical conductor, an X-ray sensitive material disposed between the first and second electrical conductors and a dielectric layer disposed between the X-ray sensitive material and the second electrical conductor, configuring and arranging the first and second mutually spaced electrical conductors, the X-ray sensitive material and the dielectric layer with respect to each other and operating them such that imagewise X-ray radiation impinging on the X-ray sensitive material causes a corresponding imagewise replica of the imagewise X-ray radiation to be formed in the second electrical conductor.

Additionally in accordance with a preferred embodiment of the present invention also including the step of reading the imagewise replica of the imagewise X-ray radiation formed in the second electrical conductor.

Moreover in accordance with a preferred embodiment of the present invention the reading includes causing a radiation source to scan over at least part of the second electrical conductor.

Still further in accordance with a preferred embodiment of the present invention the scan step causes at least one first source of radiation to impinge on but does not pass entirely through the X-ray sensitive material.

Additionally in accordance with a preferred embodiment of the present invention also including causing at least one second source of radiation to generally passes through the X-ray sensitive material.

Additionally in accordance with a preferred embodiment of the present invention the reading step includes using read electronics coupled to the second electrical conductor for sensing an electric current flowing therealong as the radiation source scans over the second electrical conductor as the at least first radiation source is operative.

Moreover in accordance with a preferred embodiment of the present invention operation of the reader causes radiation to impinge on the X-ray sensitive material, with the result that the corresponding charge pattern therein is erased, thereby causing a redistribution of charge therein, resulting in an electrical current flow along the second electrical conductor.

Reference is made throughout the specification to X-ray radiation, it being understood that the present application is not limited to X-ray radiation, but extends as well to all suitable types of radiation including ionizing radiation, of which X-ray radiation is one example.

BRIEF DESCRIPTION OF THE DRAWINGS

The present invention will be more fully appreciated and understood from the following detailed description, taken in conjunction with the drawings in which:

FIGS. 1A and 1B illustrated two alternative embodiments of X-ray imaging systems constructed and operative in accordance with a preferred embodiment of the present invention;

FIGS. 2A and 2B are sectional illustrations taken along lines 2A—2A and 2B—2B respectively of FIG. 1A, illustrating an X-ray image detection module forming part of the systems of FIGS. 1A and 1B;

FIG. 4 is a partially cut-away pictorial illustration of an X-ray image detection module constructed and operative in accordance with a preferred embodiment of the present invention;

DETAILED DESCRIPTION OF THE DRAWINGS

Figure 1A:
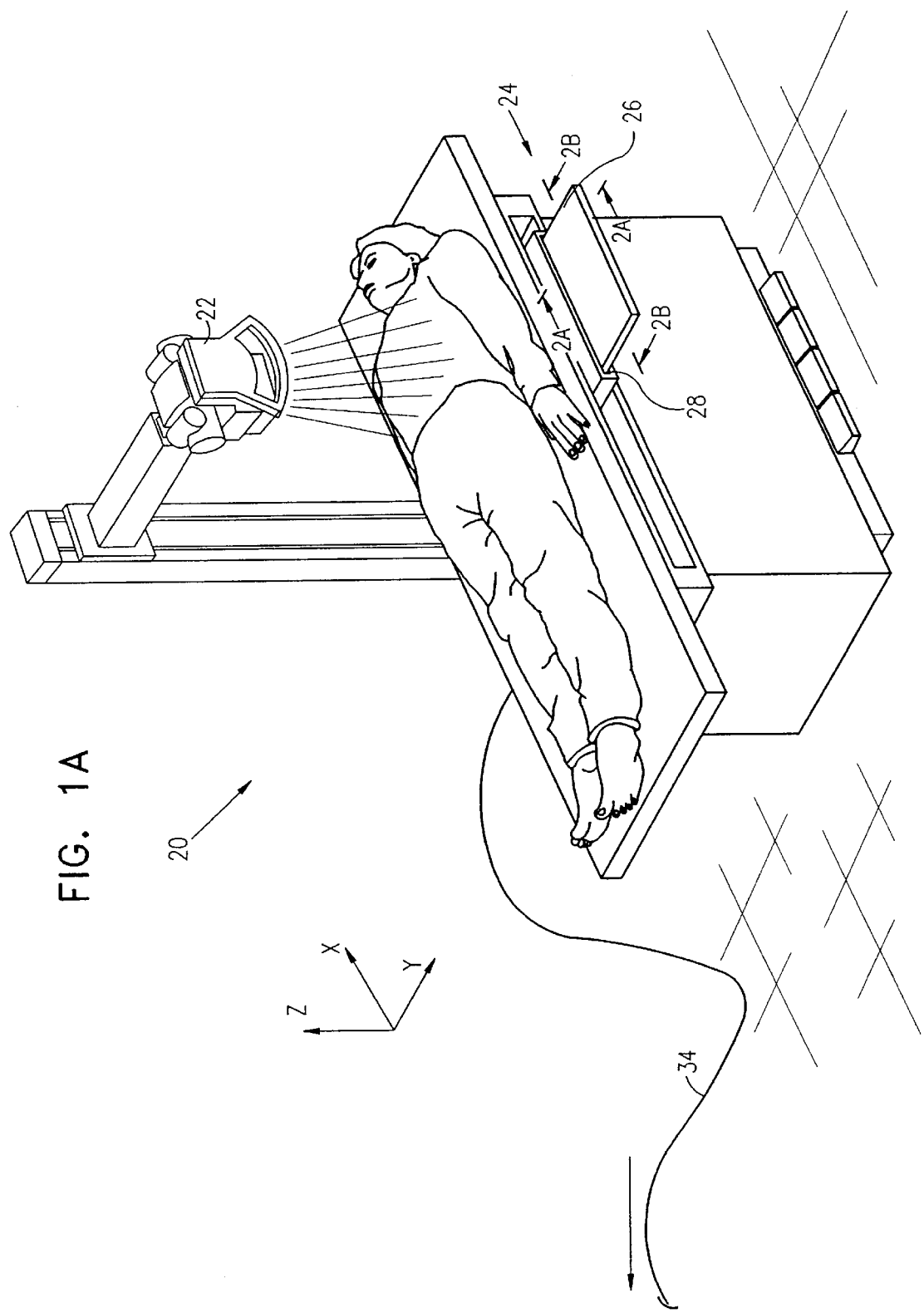

Reference is now made to FIGS. 1A and 1B which illustrate X-ray systems for digital X-ray detection incorporating an X-ray image detection module in accordance with preferred embodiments of the present invention.

FIGS. 1A and 1B illustrate X-ray systems 20 and 21, respectively, which may be of the type sold by Philips Medical Systems, the Fischer Imaging Corporation, the Bennett subsidiary of Trex Medical Corporation, etc, X-ray systems 20 and 21 include a source of X-ray radiation 22, an X-ray table 24 (FIG. 1A) and/or a vertical chest stand 25 (FIG. 1B), and further incorporate an X-ray image detection module 26, which obviates the need for a standard film cartridge. It is appreciated that the source of X-ray radiation 22 can be swiveled for use with vertical chest stand 25 as shown in FIG. 1B.

In accordance with one embodiment of the invention, image detection module 26 may be a flat-panel detection assembly, which is insertable into the bucky/grid device opening 28 of X-ray table 24 or an opening 30 of a bucky/grid device 32 mounted on vertical chest stand 25. It is appreciated that image detection module 26 may be designed with size dimensions suitable for use with standard mammography systems.

Alternatively, image detection module 26 may form an integrated element of conventional medical/diagnostic X-ray (e.g. bucky devices, X-ray tables, and vertical chest stands) or mammography systems.

During imaging, a patient to be imaged reclines on X-ray table 24 or, alternatively, stands in front of vertical chest stand 25, positioned so that an area of the patient to be imaged lies intermediate the source of X-ray radiation 22 and the image detection module 26. When the source of X-ray radiation 22 is activated, X-ray image detection module "reads" the resulting X-ray image as described herein and outputs an electrical signal representation thereof. The electrical signal representation may be transferred to a workstation (not shown) via a communications cable 34 for display, diagnostics, processing and archiving.

Figure 2A:
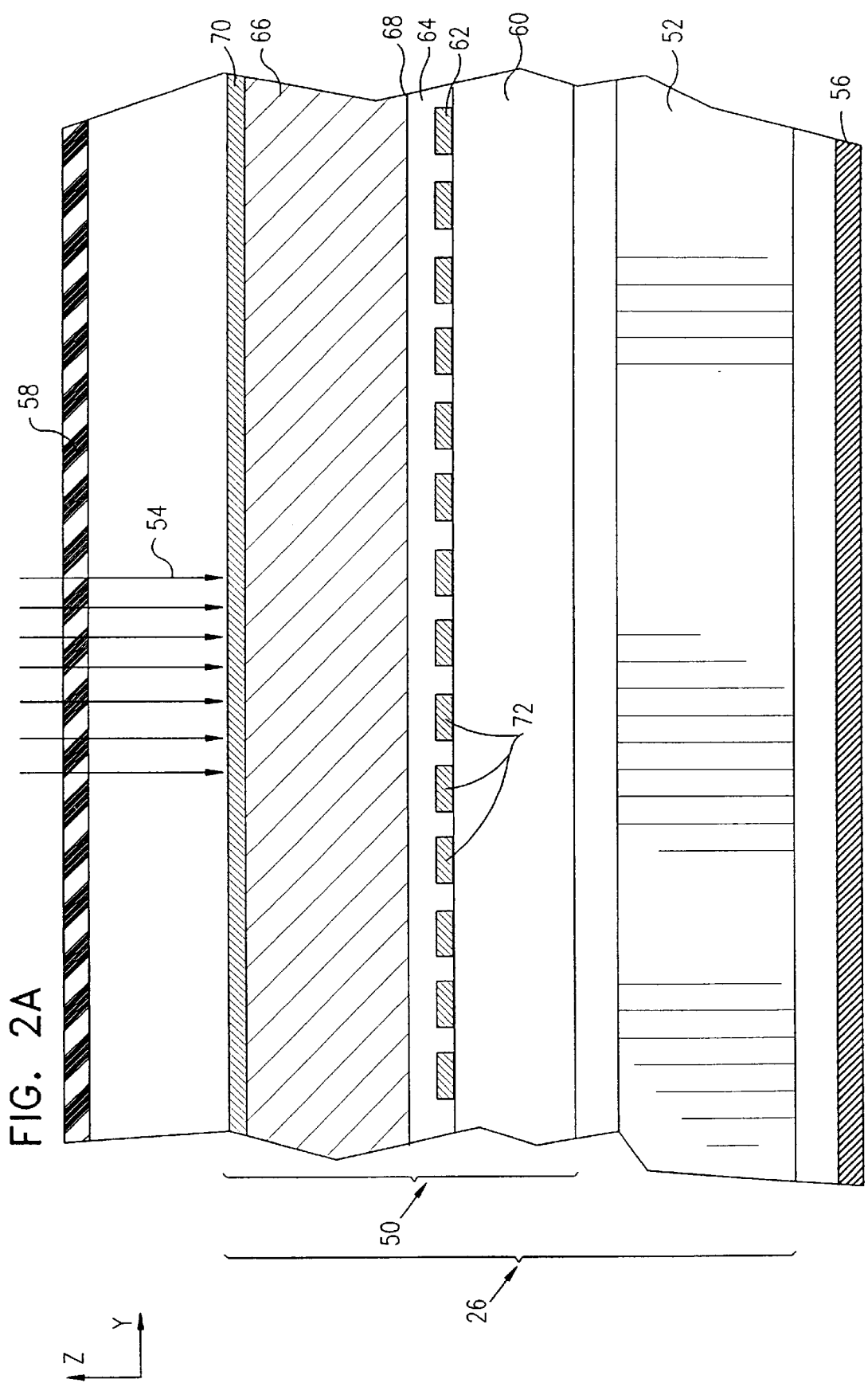

Reference is now made to FIGS. 2A and 2B which are mutually perpendicular cross-sectional views of image detection module 26.

Image detection module 26 includes a detection assembly 50 and an elongate light source 52. The detection assembly 50, which is exposed to incident radiation 54 representing an X-ray image, is preferably, enclosed by a housing 56 having an upper X-ray permeable cover 58.

Detection assembly 50 preferably comprises a layered stack having a dielectric support substrate 60, a conductive electrode array 62 formed onto and overlying the support substrate 60, a dielectric layer 64 overlying the conductive electrode array 62, an X-ray sensitive layer 66 overlying the dielectric layer 64, a very thin blocking layer (not shown) disposed at the interface 68 of the X-ray sensitive layer 66 and an overlying conductive layer 70.

Support substrate 60 provides mechanical support and dimensional stability for detection assembly 50 and may have served as a base upon which subsequent layers 62–70 were formed. In addition, support substrate 60 provides electrical insulation for conductive electrode array 62. Preferably, support substrate 60 is an optically transparent panel, several millimeters thick (approximately 1 mm–5 mm), having a flat, relatively flawless top surface. Preferably support substrate is formed of glass. Examples of suitable materials for support substrate 60 are Corning glass 7059 and 1737.

In accordance with alternative embodiments of the present invention, support substrate 60 and overlying layers 62–70 may be cylindrical to provide a drum-based detection assembly where relative motion between the drum-based detection assembly and an elongate light source is provided by rotating the drum.

In accordance with a preferred embodiment of the present invention, conductive electrode array 62 comprises a plurality of strip electrodes 72 which are preferably planar, elongate and parallel and which end in fan-out regions (not shown).

Conductive electrode array 62 is preferably formed using photolithography and microetching techniques to pattern and segment a generally continuous conductive film which is deposited on a surface of support substrate 60. Alternatively, thermal ablation techniques (e.g. laser etching) can be used for patterning and segmentation of the conductive film.

The conductive film, which is preferably a transparent indium tin oxide (ITO), is typically deposited on support substrate 60 using conventional vacuum deposition techniques, to provide a uniform layer which is typically 1,000–10,000 angstroms thick.

Alternatively the conductive film may be a thin metallic coating, e.g. aluminum or gold, which is sufficiently thin so as to exhibit a high degree of transparency to radiation in the visible spectrum.

The pitch of adjacent strip electrodes 72 of conductive electrode array 62 determines the resolution of detection assembly 50 in one direction.

For example, resolutions of 10–20 lines per millimeter can be achieved using strip electrodes 72 having a pitch of 100–50 microns, respectively. Preferably, the width of each strip electrode 72 is two to four times greater than the gap between adjacent electrodes.

Figure 9:
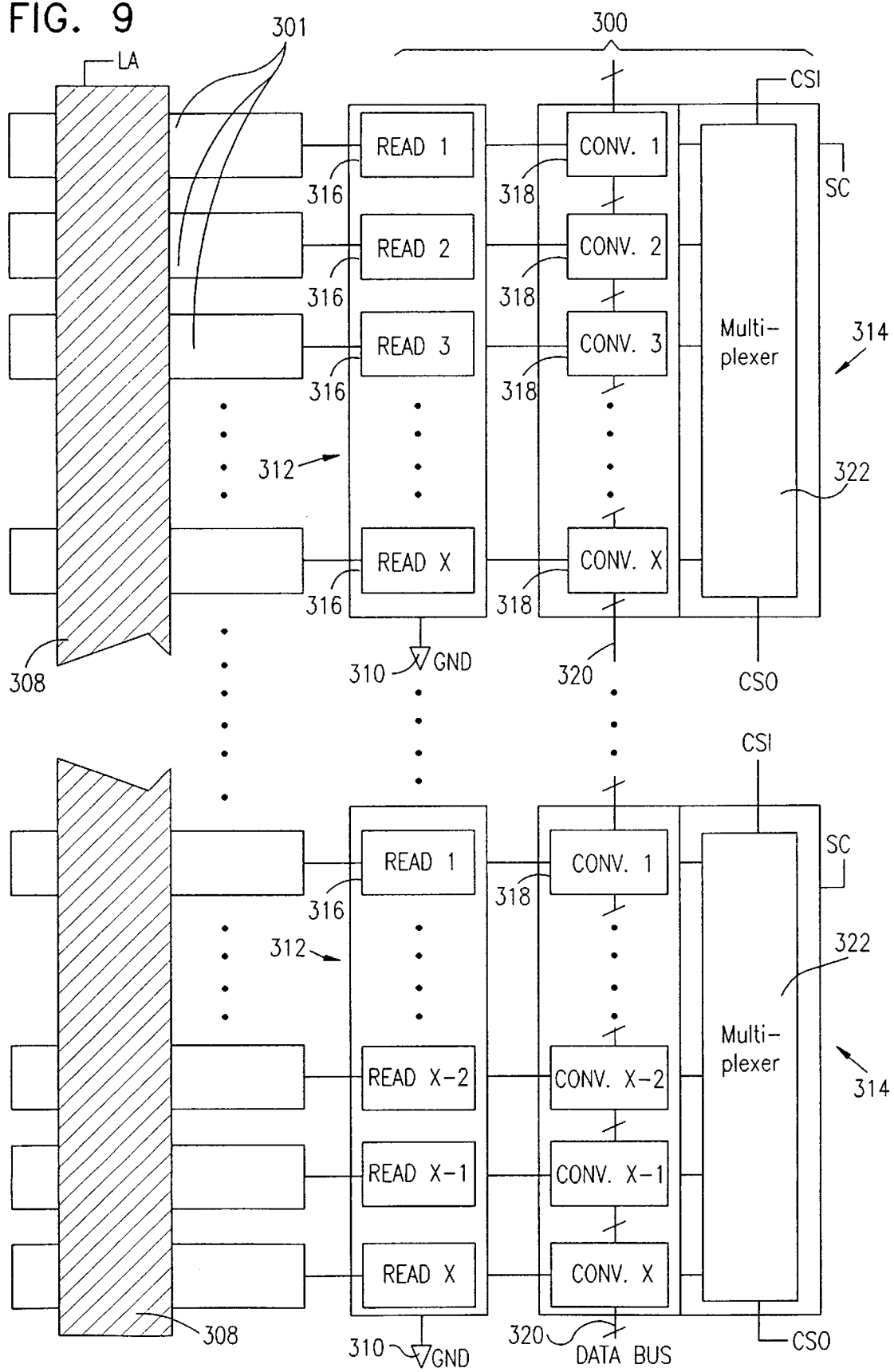
FIG. 9 is a simplified illustration of read-out electronics employed in the X-ray image detection module of FIGS. 1A–7 in accordance with one embodiment of the present invention.
Figure 10:
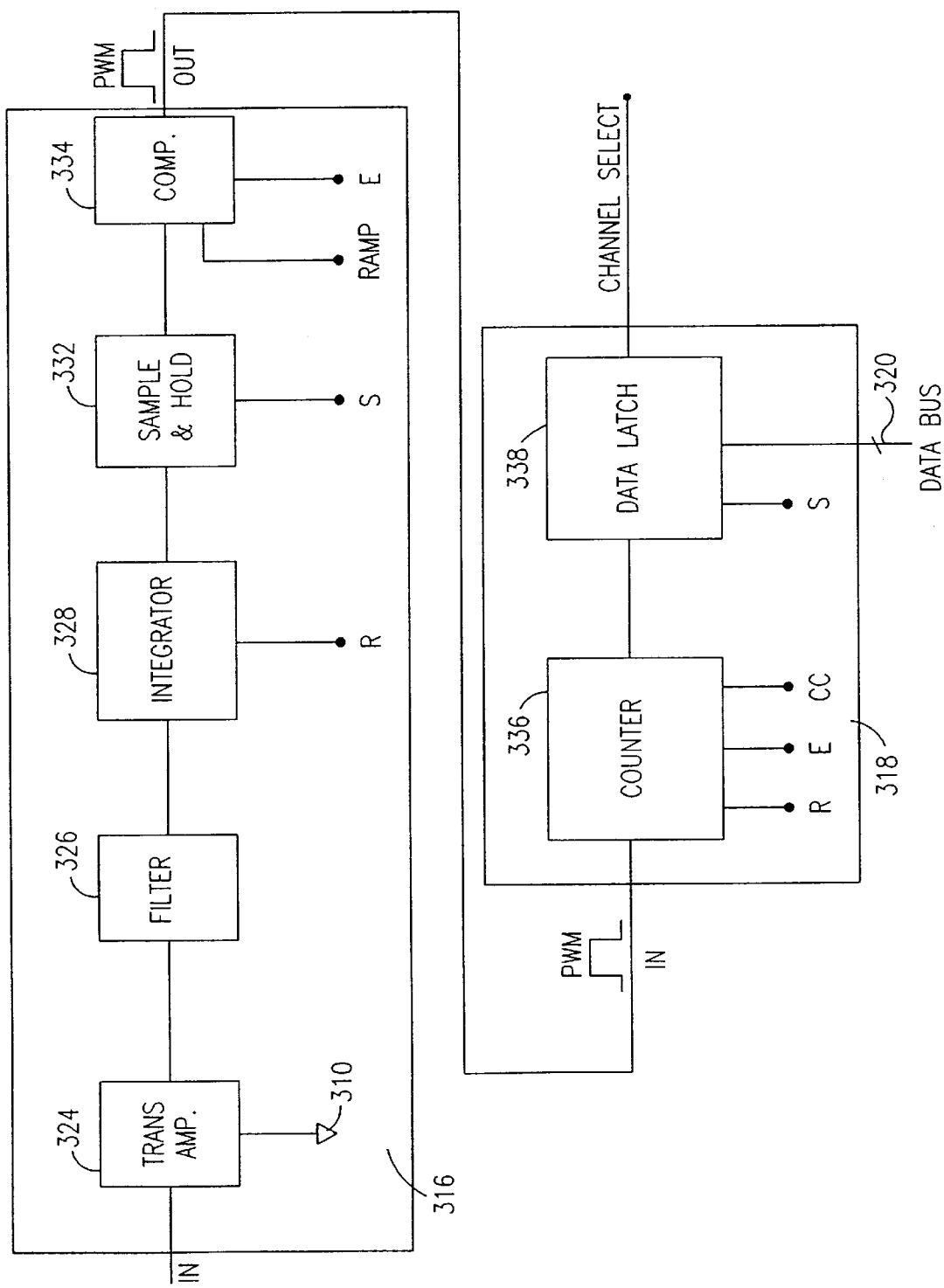
FIG. 10 is a block diagram illustration of portions of the apparatus of FIG. 9.
Figure 11:
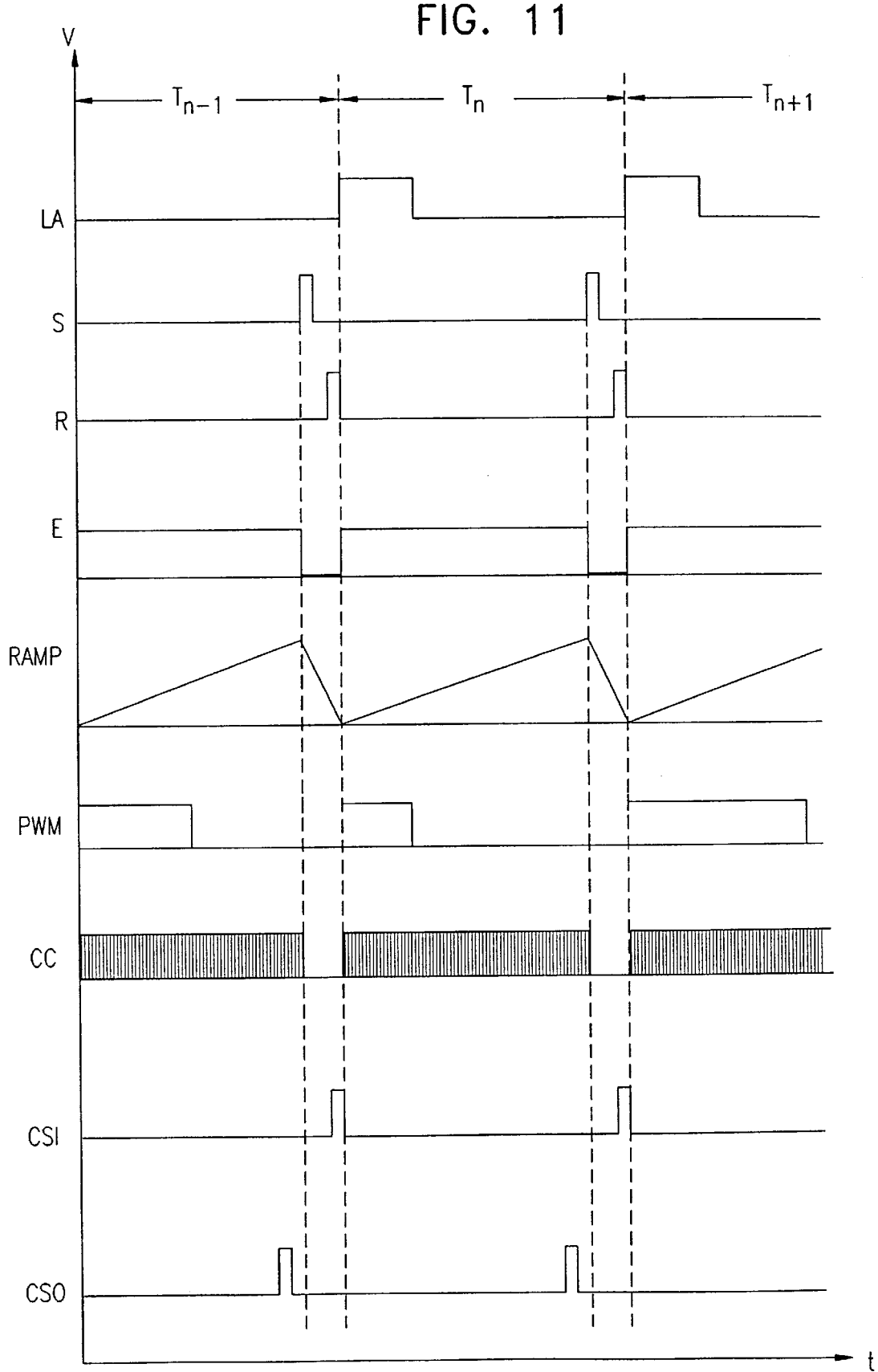
FIG. 11 is a timing diagram useful in understanding of the operation of the X-ray detection module of FIGS. 1A–9.

Typically, readout electronics, which are described hereinbelow with reference to FIGS. 9–11, are connected to connection fan-out regions (not shown) of conductive electrode array 62. The connection region, which may be at one or more non-active locations of detection assembly 50, are provided in order to enable standard electronic connection technologies (e.g. chip-on-glass, flip-chip) to be used. Preferably, non-active locations are located at the periphery of detection assembly 50.

Dielectric layer 64 overlies and electrically insulates conductive electrode array 62. Preferably it fills the gaps between adjacent strip electrodes 72.

The material properties desirable for dielectric layer 64 include volume resistivity which is greater than $10^{14}$ ohms/centimeter and which is preferably in the range of $10^{16}$ ohms/centimeter, high dielectric strength (preferably in the range of 50 volts/micron or higher), optical transparency to radiation in the visible spectrum, a low dielectric constant ($\epsilon_d$=2), and suitability to serve as a smooth accepting substrate for subsequent layers which may be deposited thereon using vacuum deposition techniques or chemical vapor deposition (CVD).

An example of a suitable material for dielectric layer 64 is silicon dioxide which may be applied using chemical vapor deposition (CVD), vacuum deposition, sol-gel processes or other appropriate techniques.

Preferably, dielectric layer 64 is highly uniform with a thickness ($d_d$) in the range of 10–80 microns. Preferably, the thickness of dielectric layer 64 is selected to be less than half of the pitch between strip electrodes 72 in order for the detector resolution to maintain the pitch resolution. The required thickness of the dielectric is arrived at by solving the electrostatic problem with the boundary conditions associated with conductive electrode array 62 and dielectric layer 64.

X-ray sensitive layer 66, which overlies dielectric layer 64, preferably exhibits properties which make it suitable to act as an X-ray imaging material—i.e. following exposure to incident photons, the material generates a suitable number of extractable free electron hole pairs with preferably high charge carrier mobility and lifetime. In addition, X-ray sensitive layer 66 preferably exhibits generally high dark resistivity, allowing an electric field to be maintained thereacross for a period of time required for X-ray exposure and reading. Furthermore, the density of charge carrier trap sites in X-ray sensitive layer 66 is preferably low.

X-ray sensitive layer 66 may comprise amorphous selenium, selenium alloys, lead oxide, thallium bromide, cadmium telluride, cadmium sulfide, mercury iodide or any other such material that exhibits X-ray sensitivity in the radiation spectrum of interest.

Typically for medical imaging applications, the X-ray photon energy spectrum ranges from 18 keV (mammography) to 150 keV (general radiography). Preferably, the thickness ($d_p$) of X-ray sensitive layer 66 is sufficient to allow absorption of approximately 50% or more of the flux of the incident X-ray radiation 54 as further described hereinbelow. For example, when using amorphous selenium or selenium alloys, the layer thickness required to achieve at least 50% absorption ranges from approximately 30 microns (at 18 keV) to 600 microns (at 150 keV).

A limiting factor in determining the overall thickness of X-ray sensitive layer 66 is the desired capacitive relationship between X-ray sensitive layer 66 and dielectric layer 64. Generally, and in order to achieve good responsitivity of detection assembly 50, the following ratio applies:

$$4 > (\epsilon_d/d_d)/(\epsilon_p/d_p) \geq 1 \quad \text{(Eq. 1)}$$

where $\epsilon_p$=dielectric constant of X-ray sensitive layer 66; and
$d_p$=thickness of X-ray sensitive layer 66; and
$\epsilon_d$=dielectric constant of dielectric layer 64; and
$d_d$=thickness of dielectric layer 64;

The thickness of X-ray sensitive layer 66, $d_p$, is determined by the radiographic properties required for the X-ray imaging desired as described hereinabove. Accordingly the thickness of dielectric layer 64, $d_d$, is determined by the desired read resolution. Thus, in order to allow values $d_d$ and $d_p$ to be in the optimal range while satisfying the equation described hereinabove, selection of a dielectric material for dielectric layer 64 with a relatively low dielectric constant $\epsilon_d$ (i.e. $\epsilon_d$=2) is desirable.

When using the materials mentioned hereinabove for X-ray sensitive layer 66 and a material with a relatively low dielectric constant for dielectric layer 64, $\epsilon_p$ is two to six times greater than $\epsilon_d$. As a result, thickness $d_p$ of X-ray sensitive layer 66 is approximately one order of magnitude greater than thickness $d_d$ of dielectric layer 64, in accordance with Eq. 1.

Conductive layer 70 is typically a uniform metallic layer, e.g. gold, aluminum, evaporated on X-ray sensitive layer 66 using standard techniques. The junction between conductive layer 70 and X-ray sensitive layer 66 preferably includes an electrical blocking layer (not shown) preventing undesired charge injection from conductive layer 70 to X-ray sensitive layer 66 following application of a strong electric field across X-ray sensitive layer 66.

Shown in FIG. 2B is the elongate light source 52 which includes a light source assembly 74 and an optical enclosure 76 in accordance with a preferred embodiment of the invention. Preferably, light source assembly 74 includes a plurality of quasi-point sources as described hereinbelow with respect to FIG. 4. According to a preferred embodiment of the present invention, quasi-point sources are light emitting diodes (LEDs) arranged in at least one linear array.

Optical enclosure 76 preferably comprises an elongate light absorbing cover 78 and an elongate facet 80 having an inner reflective surface 82. Elongate facet 80 is preferably positioned relative to cover 78 so as to define an elongate opening 84 through which an elongate light beam 86 from light source assembly 74 is projected.

Preferably, a leading edge 88 of elongate light beam 86 is offset by a predefined angle 90 from a normal 92 to interface 68. This is to ensure that light reflected by any interface between layers of detection assembly 50 (FIGS. 2A and 2B), through which elongate light beam 86 travels before reaching interface 21, propagates away from leading edge 88.

Typically, elongate light source 52 is capable of sweeping back and forth in the x-direction along an axis 94 along conductive electrode array 62 using electromechanical means (not shown) to provide linear motion thereof along linear guides (FIG. 4).

In the z-direction, the spacing between elongate light source 52 and detection assembly 50 is generally fixed at a predetermined distance which is typically 0.2 mm–2 mm. The precise distance is not critical and is selected in accordance with general design considerations of image detection module 26.

Preferably, and in order to achieve a fairly compact image detection module 26, the height of elongate light source 52 is fairly low, e.g. 5–10 mm.

Figure 3:
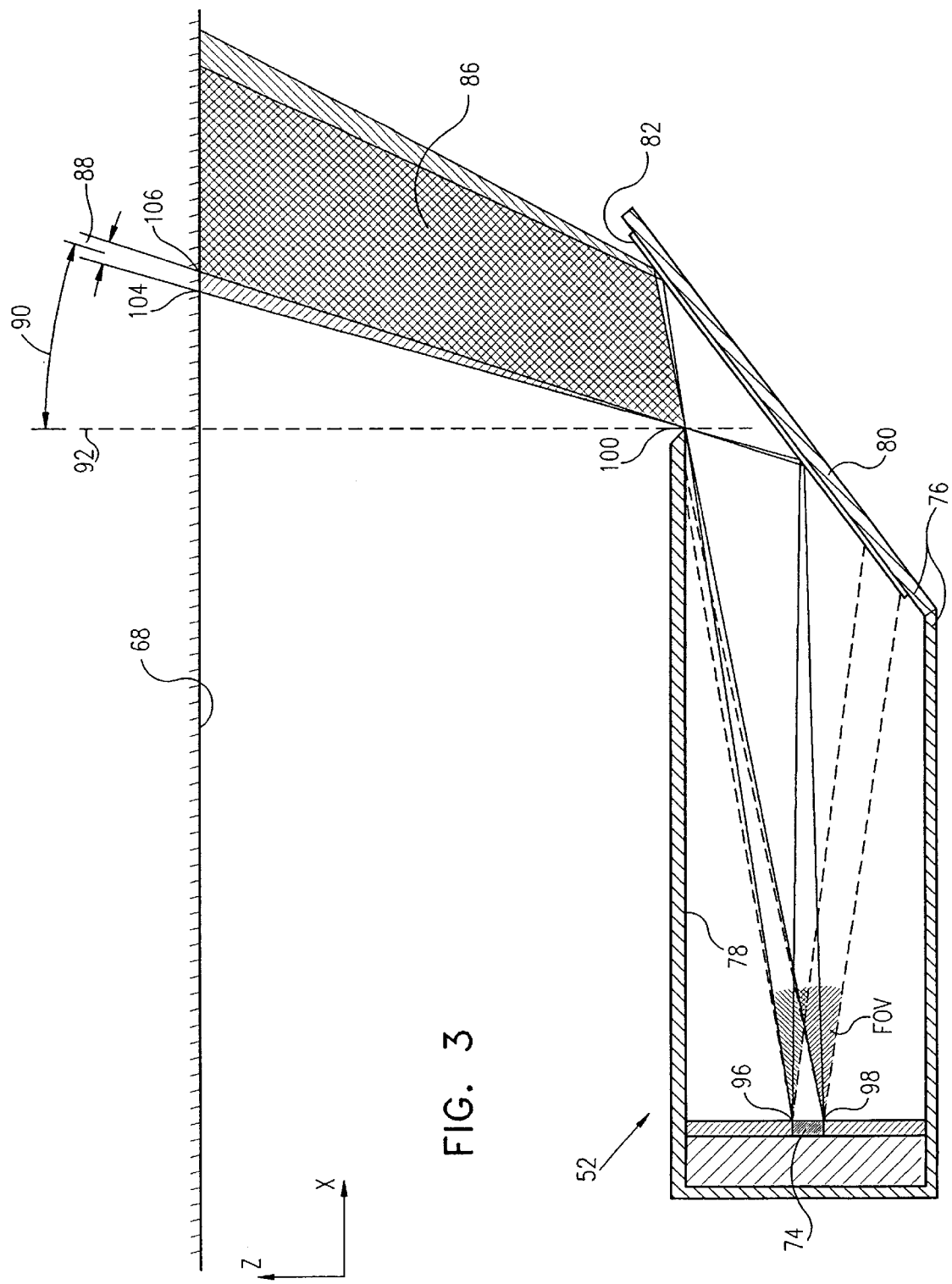
FIG. 3 is an further enlarged illustration of part of the apparatus of FIG. 2B, including ray tracing.

Reference is now made to FIG. 3 which illustrates an expanded cross section of elongate light source 52 and elongate light beam 86 taken along line 2B—2B (FIG. 1A) in accordance with a preferred embodiment of the present invention. For the sake of simplicity, of the layers of detection assembly 50, only interface 68 between dielectric layer 64 and X-ray sensitive layer 66, is shown.

FIG. 3 illustrates the optical geometry associated with a quasi-point source of light source assembly 74. The illustrated geometry arises from the non-zero dimensions of each quasi-point source and the resulting ray optic composition associated with elongate light beam 86.

Since geometrical optics provide a valid description of incoherent light sources of the type used herein, each quasi-point source of light source assembly 74 can be considered as being composed of a plurality of points with each point emitting a bundle of rays into a determined Field of View (FOV). Ray bundles, which are emitted by uppermost points 96 and lowermost points 98 and which strike an elongate enclosure edge 100 following reflection from elongate facet 80, define a shade region between locations 102 and 104 determining the sharpness profile of leading edge 88 of elongate beam 86.

In the X-direction, the light intensity of leading edge 88 sharply drops from a maximum intensity value at location 102 to a near zero intensity at location 104. The sharp drop off of leading edge 88 at the plane of interest, i.e. the dielectric/X-ray sensitive layer interface 68, can be enhanced as the dimensions of each quasi-point source are reduced, as the optical path from a quasi-point source to elongate enclosure edge 100 is lengthened and as the optical path from elongate enclosure edge 100 to interface 68 is shortened.

Preferably, quasi-point sources are LEDs having a relatively small FOV which allow delivery of a relatively high intensity of illumination to elongate light beam 86 which is shaped by elongate enclosure edge 100. LEDs of the type described hereinbelow are available with a FOV as small as 15 degrees. Thus, using an appropriate geometry, the intensity drop off of leading edge 88 at interface 68, determining the sharpness profile of the leading edge, is less than 15 microns, which is suitable for high resolution image reading.

Reference is now made to FIG. 4 which is a partially cut away pictorial illustration of part of image detection module 26, which illustrates the relationship between the various layers of detection assembly 50 and elongate light source 52, as well as the axis 94 along which the elongate light source 52 sweeps in its scanning operation.

Typically, light source assembly 74 comprises a reading array 106 having a plurality of quasi-point sources, e.g. light emitting diodes (LEDs) and an erasing array 108 having a plurality of quasi-point sources, e.g. light emitting diodes (LEDs).

Reading array 106 and erasing array 108 are electrically driven by external power drivers (not shown). Preferably, the LEDs of each array are collectively activated to emit light by pulses or continuously in accordance with instructions received from the read electronics as described hereinbelow, which reflect the mode of reading that is in operation.

Preferably reading array 106 and erasing array 108 emit light at different spectral wavelengths, selected in accordance with the material used for X-ray sensitive layer 66.

For example, when X-ray sensitive layer 66 is amorphous selenium or a selenium alloy, reading array 106 preferably emits blue light with a peak wavelength of approximately 470 nanometers. Examples of suitable blue light emitting LEDs are Indium gallium-nitride/Gallium-nitride/Silicon carbide blue LEDs of the types available from Hewlett-Packard, Nichia Chemical Industries, Ltd. or Cree Research.

When X-ray sensitive layer 66 is amorphous selenium or a selenium alloy, erasing array 108 is preferably selected so that it emits light with a broader spectrum including wavelengths at the longer end of the visible spectrum. An example is white light emitting LEDs such as those available from Nichia Chemical Industries Ltd., which combine blue LEDs and phosphor technology. Preferably, light emitted from erasing array 108 is capable of penetrating deep into X-ray sensitive layer 66.

Individual beams projected from each quasi-point source overlap at the X-Y plane of interface 68 between dielectric layer 64 and X-ray sensitive layer 66 thus creating elongate beam 86 which is continuous and which transverses strip electrodes 72 of conductive electrode array 62.

The desired overlap at interface 68, is achieved by selecting the appropriate pitch between quasi-point sources in reading array 106 and erasing array 108, given the geometrical considerations of elongate light source 52, the thickness of substrate 60, the spacing between substrate 60 and elongate light source 52, and the emission field of view (in the X-Y plane) of each quasi-point source.

As shown in FIG. 2B, a light beam from reading array 106 or erasing array 108 of light source assembly 30 expands (in accordance with the field of view of each quasi-point source) and strikes inner reflective surface 82 of elongate facet 80. Elongate facet 80 is preferably slanted to project impinging light towards detection assembly 50 through elongate opening 84.

Preferably, light emitted from reading array 106 or erasing array 108 is only partially projected through elongate opening 84. Non-projected light is bland absorbed by inner surfaces of elongate light absorbing cover 78. Thus, a light beam, projected through elongate opening 84, is shaped by elongate enclosure edge 100.

Preferably, reading array 106 is positioned in the Z-direction with respect to optical enclosure 76 such that light projected through elongate opening 84 has its maximum intensity in the X-direction over elongate enclosure edge 100.

The position of erasing array 108 in the Z-direction with respect to optical enclosure 76 is preferably selected such that light projected through elongate opening 84 has its maximum intensity in the X-direction over the center of elongate opening 84.

In the Y-direction, elongate light beam 86 is generally continuous. Fluctuations in the beam intensity in the Y direction are acceptable, provided that the minimum intensity value remains above the threshold value required for reading or erasing as discussed hereinbelow. In the Z-Y plane, the ray composition of elongate light beam 86 may include unrestricted broad distribution of ray incidence angles.

It is appreciated that the sweep of elongate light source 52 is carried out using electro-mechanical means (not shown) along linear guides 110.

Reference is now to made to FIGS. 5A–5E which illustrate the operation of a detection assembly 150 constructed and operative in accordance with a preferred embodiment of the present invention, which may serve as detection assembly 50 in the embodiment of FIGS. 2A–4.

Detection assembly 150 comprises a generally continuous conductive layer 152, an underlying generally very thin blocking layer (not shown), an X-ray sensitive layer 154 underlying the generally thin blocking layer, a dielectric layer 156 underlying the X-ray sensitive layer 154, and a conductive electrode array 158 preferably having a plurality of elongate strip electrodes (not shown). Detection assembly 150 further includes an optically transparent support layer (not shown).

For the purpose of the discussion to follow, conductive electrode array 158 can be considered, electrostatically, as being a continuous electrode, since the gaps between strips thereof are typically beneath the overall operating resolution of detection assembly 150.

Figure 5A:
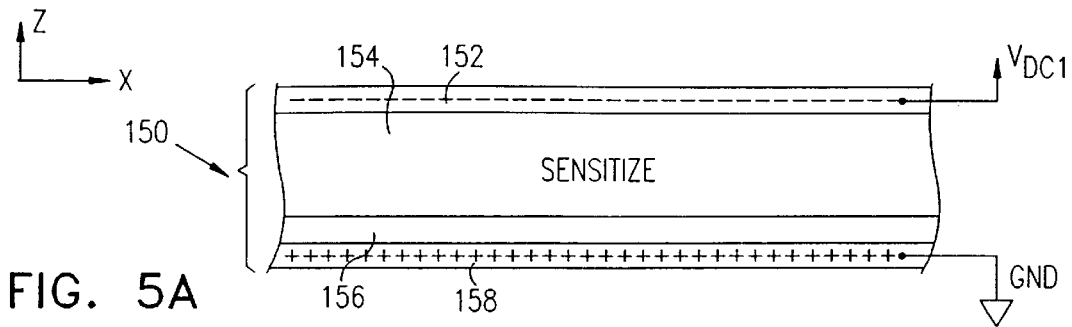
FIGS. 5A, 5B, 5C, 5D and 5E are simplified illustrations showing operation of the X-ray image detection module of FIGS. 2A–4.
Figure 5B:
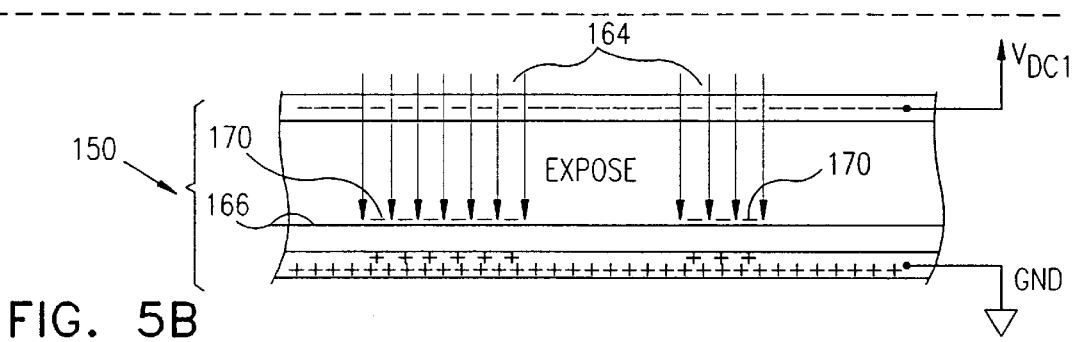
Figure 5C:
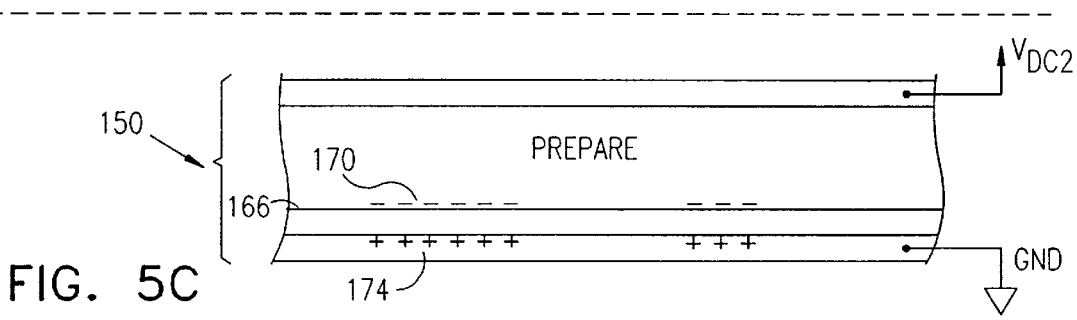
Figure 5D:
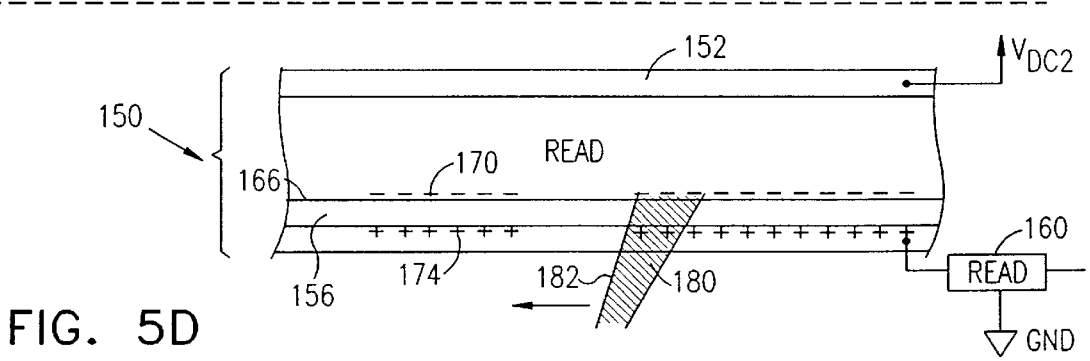

An electric field is created across X-ray sensitive layer 154 and dielectric layer 156 by biasing conductive layer 152 to a first bias voltage $V_{DC1}$ and by biasing conductive electrode array 158 to a ground potential through read electronics 160 (FIG. 5D). Voltage $V_{DC1}$ and ground potential are applied by a voltage source (not shown).

Read electronics 160 may be as described hereinbelow with respect to the embodiment of FIGS. 9–11.

Figure 7:
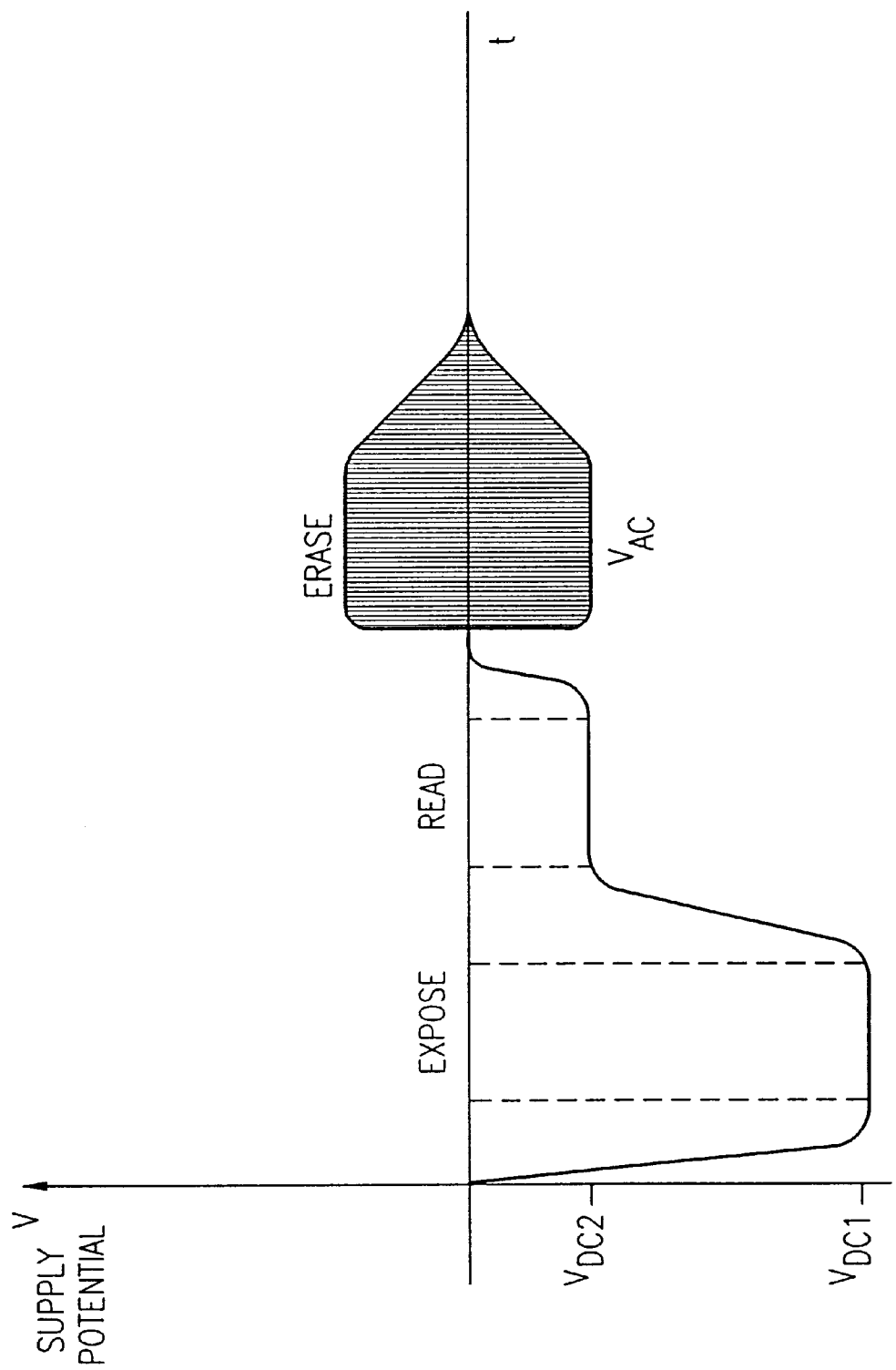
FIG. 7 is a voltage diagram useful in understanding of the operation of the X-ray image detection module as illustrated in FIGS. 5A–5E.

In addition to creating an electric field, application of bias voltages causes capacitive charging, yielding uniform charge distributions of opposite polarities in conductive layer 152 and conductive electrode array 158. Preferably, when the X-ray sensitive layer is an amorphous selenium or selenium based alloy, a negative polarity is applied to conductive layer 152 as shown in FIG. 7.

Typically, the value of $V_{DC1}$ is selected in order to create a high, but sustainable, electric field across X-ray sensitive layer 154. For example, if X-ray sensitive layer 154 is amorphous selenium or a selenium-based alloy, the desired field strength is preferably in the range of 5–20 volts/micron.

Creation of an electric field within X-ray sensitive layer 154 causes sensitization of the X-ray sensitive material in preparation for exposure to X-ray radiation, with a higher field strength providing increased sensitivity to X-ray radiation.

Preferably, sensitization is carried out immediately prior to X-ray exposure as described hereinbelow.

FIG. 5B illustrates the exposure of detection assembly 150 to X-ray imaging radiation 164. X-ray imaging radiation 164 is partially absorbed by X-ray sensitive layer 154, with the absorbed radiation representing a transmission modulated X-ray image of an object (e.g. a region of the human body).

Radiation photons which are more energetic than the band gap of the X-ray sensitive material create free electron/hole pairs in X-ray sensitive layer 154 in accordance with an image-wise pattern. The electric field present across X-ray sensitive layer 154, causes the electron/hole pairs to separate, creating charge carriers of different polarities which move in opposing directions along electric field lines which are perpendicular to the plane of X-ray sensitive layer 154.

If the electric field is sufficiently strong, space charge effects are negligible and charge carrier transit is along straight field lines normal to the plane of X-ray sensitive layer 154, with virtually no sideways movement (lateral spread) of charge which could cause blurring or scattering and a corresponding reduction of image resolution. Thus, with a sufficiently strong electric field, generally high resolutions are typically maintained over X-ray sensitive layer 154, with minimal dependence on the layer thickness.

Since a negative polarity is applied to conductive layer 152 in the example shown, positive charge carriers move towards conductive layer 152 and negative charge carriers move to and are retained on an interface 166 between X-ray sensitive layer 154 and dielectric layer 156, thus creating a charge image 170 at interface 166 which replicates the transmission modulated image represented by X-ray imaging radiation 164.

Following X-ray exposure and creation of charge image 170 at interface 166, charge redistribution occurs in conductive layer 152 and conductive electrode array 158 in order to maintain a constant potential difference $V_{DC1}$ therebetween.

As a result of the charge redistribution, the electric field over X-ray sensitive layer 154 is no longer uniform—instead the electric field is weakened and reduced from its initial value in an image-wise manner. The field strength at any location is weakened in proportion to the amount of radiation absorbed thereby. Since the potential difference $V_{DC1}$ remains constant during X-ray exposure, the electric field across dielectric layer 156 is strengthened and increased, in an imagewise manner, from its initial value. This yields a spatially distributed electric field pattern complementary to that over X-ray sensitive layer 154 and corresponding to charge image pattern 170 retained at interface 166.

Figure 6A:
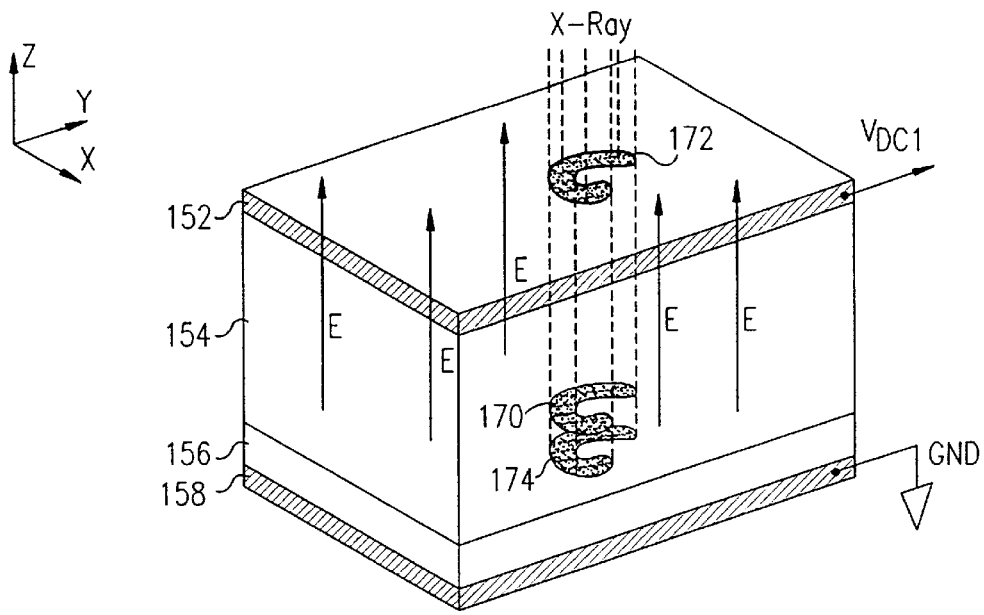
FIGS. 6A and 6B are simplified illustrations which serve to enable better understanding of the operation of the X-ray image detection module as illustrated in FIGS. 5A–5C.

A further result of the charge flow and redistribution following X-ray exposure is patterning of the initially uniform charge distribution within conductive layer 152 and within conductive electrode array 158 as shown in FIG. 6A. Spatial charge pattern replicas 172 and 174 of charge image 170 are created by replica forces applied to mobile charges within conductive layer 152 and conductive electrode array 158, respectively.

Replica forces are the result of straight field lines extending normal to the detector plane associated with abrupt discontinuities in the intensity of the electric field, when moving normal to the plane, from X-ray sensitive layer 154 to conductive layer 152 and from dielectric layer 156 to conductive electrode array 158, since, the electric field across a conductor is zero. This causes imagewise attraction of surface charge within the respective conductive layers 152 and 158, corresponding to the imagewise intensity of the electric field pattern extending normal to the conductive layers.

In order to minimize lateral charge carrier spread in X-ray sensitive layer 154 during charge carrier transit following X-ray exposure and corresponding dissipation of charge pattern replicas 172 and 174, the maximum reduction of any local electrical field (corresponding to maximum X-ray exposure) across X-ray sensitive layer 154 should preferably not exceed approximately one-third of the initial field strength.

Thus, in order to maintain high resolution, the maximum dose of X-ray imaging radiation 164 preferably does not exceed the dose necessary to reduce the initial local electrical field across X-ray sensitive layer 154 by one-third.

Subsequent to X-ray exposure and charge redistribution, detection assembly 150 is prepared for a read cycle as illustrated in FIG. 5C.

Preferably, for reading, the potential difference between conductive layer 152 and conductive electrode array 158 is reduced to $V_{DC2}$, which is approximately one-third of $V_{DC1}$, as shown in FIG. 7.

The purpose of reducing the potential difference is to factor out a significant DC component of the electrical field across X-ray sensitive layer 152, bringing the electrical field to the minimum level which still retains charge image 170 with no dissipation. Typically, this brings the electrical field at interface 166, for locations which received maximum exposure, to a minimal, nearly zero field level. Corresponding locations at dielectric layer 154 experience a maximum field value.

As a result, electrical stress across X-ray sensitive layer 152 is significantly reduced while image information represented by charge patterns over interface 166 remains intact.

Figure 6B:
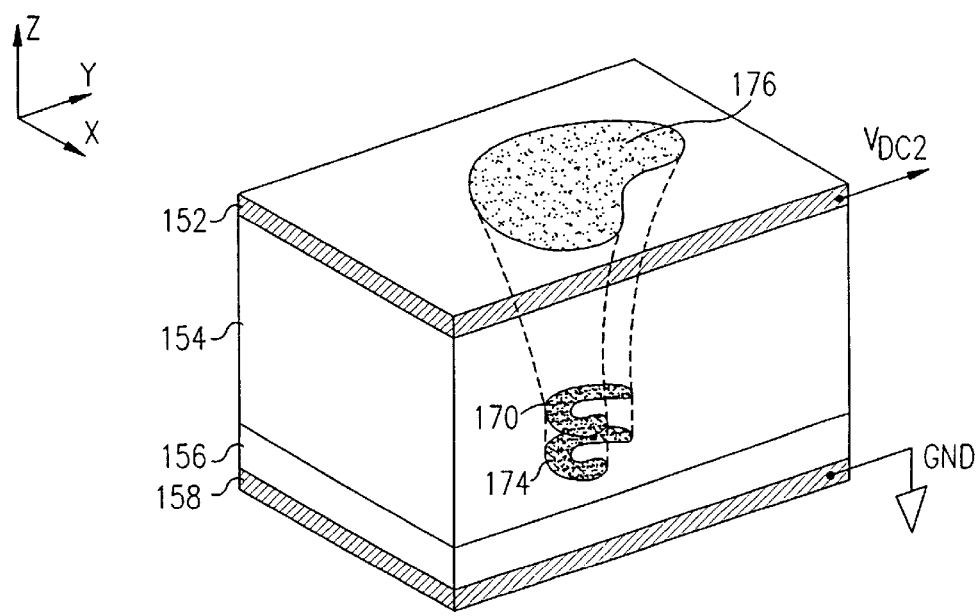

As shown in FIG. 6B, reducing the potential to $V_{DC2}$ causes capacitive discharge of detection assembly 150 and further charge redistribution after which conductive layer 152 retains a new charge distribution 176 which is no longer a replica of charge image 170. Dissipation of charge replica 172 (FIG. 6A) occurs because replica forces applied to mobile charges within conductive layer 152 are strongly weakened when factoring out the significant DC component of the electric field across X-ray sensitive layer 154.

By contrast, charge pattern replica 174 at conductive electrode array 158 remains intact since replica forces on mobile charges in conductive electrode array 158 remain sufficiently strong, due to the relative thinness of dielectric layer 156, the electric field present across dielectric layer 156 and the relationship therebetween.

Charge pattern replica 174 tracks charge image 170, which is maintained as long as $V_{DC2}$ is applied Changes induced in the charge distribution of charge image 170 result in corresponding charge redistribution in charge pattern replica 174.

When using apparatus as described hereinbelow to bring charge image 170 to a uniform charge density level, currents flow in conductive electrode array 158 to cause corresponding uniformization of charge pattern replica 174. The currents flowing can be measured by readout electronics 160 as described hereinbelow, thus reading charge pattern replica 174 and providing an electrical signal representation of charge image 170. The electrical signal representation also includes a DC component which is a function of the charge density level to which charge image 170 is uniformized. Preferably the DC component is minimized in order to allow a broader dynamic range for signal readout.

As can be understood from the descriptions herein, the DC component is a function of potential $V_{DC2}$, with a lower value for $V_{DC2}$ (which still maintains the charge image 170 with no dissipation) corresponding to a lower DC component associated with signal readout.

FIG. 5D illustrates the reading of charge image 170 by sequential line-by-line uniformization of raster lines of the image using an elongate light beam 180. Elongate light beams 180 and 184 (FIG. 5E) are generated by an elongate light source (not shown) which may be of the type described hereinabove.

Reading occurs as follows:

Elongate light beam 180, having a sharply defined leading edge 182, impinges upon interface 166 through the transparent underside of detection assembly 150, exposing an area of charge image 170. The elongate light source comprises two distinct LED arrays (reading and erasing) as described hereinabove with reference to FIGS. 4, the reading array is active during the read cycle.

Preferably, the light spectrum emitted from reading array of elongate light source is chosen with respect to the material of X-ray sensitive layer 154 such that it does not penetrate deeply into the X-ray sensitive material. Instead, it is absorbed in a very thin surface layer (several microns) at exposed regions. For example, when amorphous selenium or a selenium alloy is used for X-ray sensitive layer 154, blue light emitting LEDs are preferably used for the reading array of the elongate light source as described hereinabove.

Impinging light from the reading array 106 (FIG. 4) causes generation of electron/hole pairs in exposed areas of X-ray sensitive layer 154, which are separated by the electric field present thereacross, with the relatively more mobile holes being transported towards conductive layer 152, resulting in electrical discharge thereof Electrical discharge continues until local fields over X-ray sensitive layer 154 at interface 166 have been effectively neutralized at exposed areas, resulting in a uniform charge distribution at interface 166 at exposed areas.

The minimum intensity along elongate light beam 180 must be sufficient to fully discharge exposed areas of charge image 170 during reading. Fluctuations in light beam intensity, above the minimum, are not detrimental to the reading operation.

In accordance with the shape of elongate light beam 180, areas of charge image 170 are exposed and undergo a charge pattern uniformization.

Typically, for reading, the profile of sharply defined leading edge 182 of elongate light beam 180 is the dominant factor. The trailing edge profile of elongate light beam 180 is not significant.

Beyond leading edge 182, light intensity is nearly zero and thus does not affect charge pattern 170. Moreover, reflections that occur as elongate light beam 180 impinges upon the underside layers of detection assembly 150 are directed away from leading edge 182 of elongate light beam 180 and do not affect charge image 170. Furthermore, since elongate light beam 180 is constituted of non-coherent light, light interference is inconsequential.

The elongate light source sweeps continuously along conductive electrode array 158 in synchronization with read electronics 160.

Elongate light beam 180 is preferably activated in pulses in accordance with the read sampling frequency as described hereinbelow in connection with FIGS. 9 and 11. Alternatively, elongate light beam 180 may be continuously activated during reading, independently of the read sampling frequency. In accordance with either embodiment, the read "steps" as defined by the read sampling frequency determine the width of each raster line of charge image 170 to be read.

With each read "step" of elongate light beam 180, a new raster line of charge image 170 along sharply defined edge 182 is exposed to light and undergoes uniformization. Corresponding charge redistribution in charge pattern replica 172 causes measurable currents in conductive electrode array 158, associated with the new raster line.

It is appreciated that the width of elongate light beam 180 in the x-direction is greater than one raster line and may comprise many raster lines. However, regions at which charge image 170 has been made uniform generally do not undergo further charge redistribution as a result of repeated exposure.

Measurable currents in conductive electrode array 158 are read in parallel, thus providing parallel line-by-line reading of raster lines of charge pattern 170. Since entire raster lines are read in parallel, very high speed reading can be accomplished.

Reading resolution, and thus pixel size, are adjustable in the x-direction by selecting the read "step" size, with the minimum pixel being determined by the definition/sharpness of leading edge 182 of elongate light beam 180.

In the transverse direction (y-direction), reading resolution, and thus pixel size, are adjustable electronically, with the minimum pixel size determined by the pitch of conductive strips in conductive electrode array 158 as described herein.

Upon the completion of reading as described herein, the resulting uniform charge distribution on interface 166 is erased as illustrated in FIG. 3E.

The purpose of the erasing step is to condition X-ray sensitive layer 154 for subsequent exposure and reading steps by neutralizing charges within X-ray sensitive layer 154, including charges retained at interface 166 and charges retained by trap sites distributed throughout X-ray sensitive layer 154.

In accordance with a preferred embodiment of the present invention, charge neutralization is carried out as follows:

An AC voltage is applied between conductive layer 152 and grounded conductive array 158 with an amplitude that is preferably between $V_{DC1}$ and $V_{DC2}$ as shown in FIG. 7, and with a frequency that is a function of the transit time of mobile charges across X-ray sensitive layer 154 (typically >10 kilohertz). As the AC voltage is applied, the elongate light source sweeps continuously along conductive electrode array 158 projecting an elongate light beam 184 thereon.

During erasing, elongate light beam 184 may comprise light emitted from erasing array (FIG. 4) which generally penetrates into X-ray sensitive layer 154 as described hereinabove. Alternatively, elongate light beam 184 may comprise light emitted from both reading array 106 (FIG. 4) and erasing array 108 (FIG. 4).

Radiation from elongate light beam 184 generates electron/hole pairs in X-ray sensitive layer 154 and, in addition, causes excitation of charges trapped in distributed trap sites. Under a temporal high electric field induced by the AC voltage, excited trapped charges are released from their traps, becoming mobile, and photo-generated electron/hole pairs are separated, also becoming mobile.

Thus during repeated cycles of the AC voltage, mobile charges experience displacement oscillations, with opposing charges oscillating towards one another and undergoing recombination.

After completion of the sweep by the elongate light source, the amplitude of the AC voltage applied to conductive layer 152 is gradually reduced to zero (FIG. 7).

As a result of the combination of radiation and AC voltage, any DC component in the internal electric field across X-ray sensitive layer 154 is averaged out. Thus, total charge recombination occurs by the end of the AC cycle, resulting in neutralization of X-ray sensitive layer 154.

With the AC method of charge neutralization, a bi-directional blocking layer is used, preventing charges of either polarity from being injected into X-ray sensitive layer 154 from conductive layer 152. Thus, X-ray sensitive layer 154 is inaccessible to external charge and neutralization occurs as a result of re-combination of internally generated and polarized electron/hole pairs.

Bi-directional blocking layer is fairly simple to implement and may include a dielectric thin film of submicron thickness.

In accordance with an alternative embodiment of the present invention, charge neutralization is carried out by providing an electrical short between conductive layer 152 and conductive electrode array 158 as follows:

Shorting of conductive layer 152 and conductive electrode array 158 creates an internal electric field across X-ray sensitive layer 154 due to the charges retained therein. In response to the internal electric field, charges that are free to move (i.e. not held in traps) migrate to conductive layer 152 and are removed.

In addition, counter charges are injected into X-ray sensitive layer 154 from conductive layer 152 through a blocking layer (not shown). Charge injection continues until the internal electric field, which "drives" the injection of charges, is reduced to zero, thus indicating neutralization of charge retained therein.

In accordance with the "shorting" method of charge neutralization, a uni-directional blocking layer having "rectifying" properties is used. The unidirectional blocking layer prevents injection of negative charges from conductive layer 152 into X-ray sensitive layer 154 when a negative potential is applied to conductive layer 152 (typically during read and exposure). When conductive layer 152 and conductive array 158 are electrically shorted, the internal electric field is effectively reversed and positive charges can be injected from conductive layer 152 through the uni-directional blocking layer, into X-ray sensitive layer 154 for neutralization of charges trapped therein.

The uni-directional blocking layer can be realized using aluminum for conductive layer 152 and a complex aluminum oxide thin film interface for the blocking layer. An example of this type of blocking layer is described by S. Touhri, G. Safoula, and J. C. Bernece in "Diode Devices Based on Amorphous Selenium Film", phys. Stat. Sol. (a) 159, 569–578 (1997).

Figure 8:
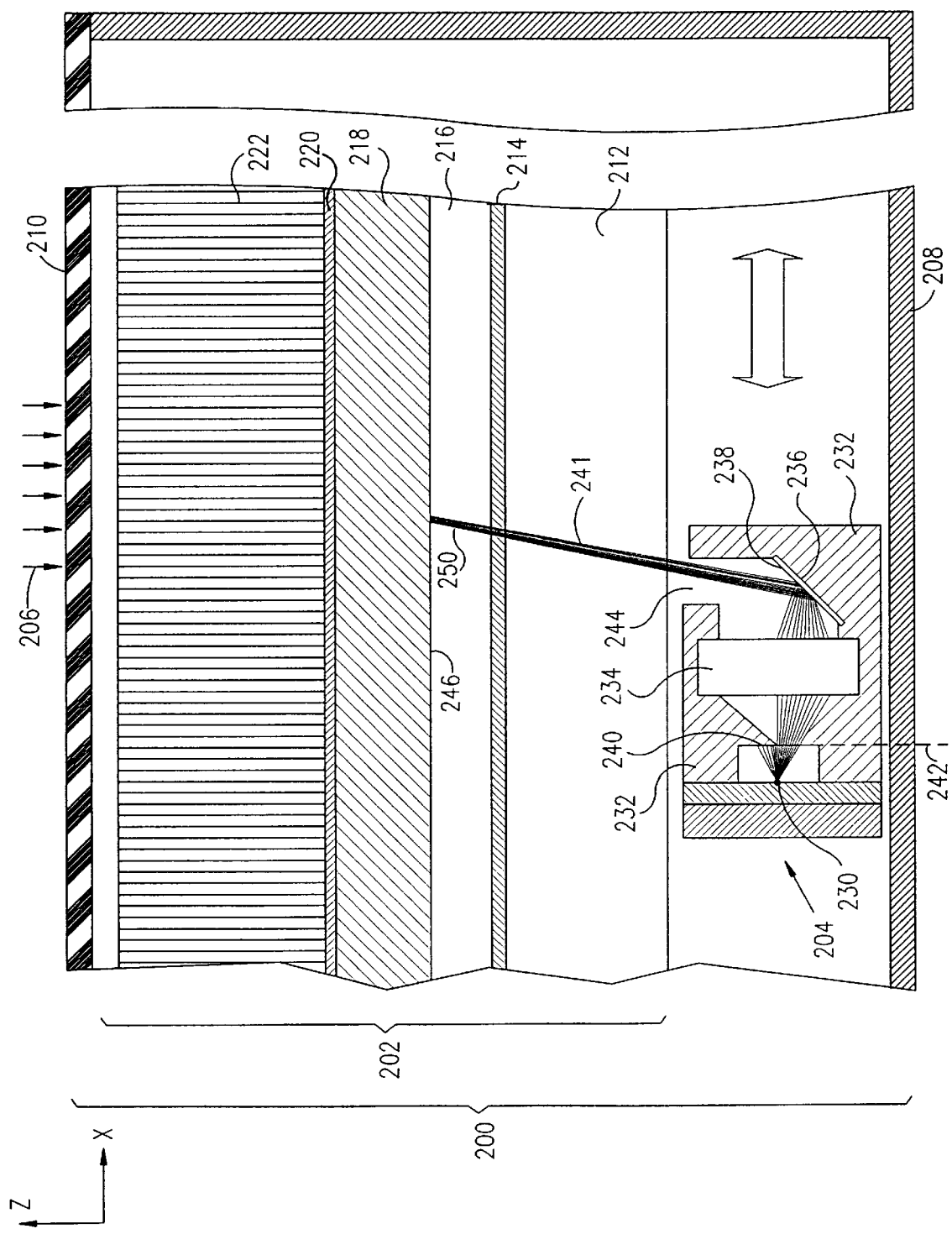
FIG. 8 is a sectional illustration taken along lines 2B—2B of FIG. 1A, illustrating an alternate embodiment of an X-ray image detection module which may serve as the x-ray detection module of FIGS. 1A and 1B.

Reference is now made to FIG. 8 which is a cross-sectional view of an image detection module 200, constructed and operative in accordance with an alternative embodiment of the present invention. It is appreciated that image detection module 200 may serve as image detection module 26 in the embodiment of FIGS. 1A–1B.

Image detection module 200 includes a detection assembly 202 and an elongate optical radiation source 204. The detection assembly 202, which is exposed to incident radiation 206 representing an X-ray image, is preferably, enclosed by a housing 208 having an upper X-ray permeable cover 210.

Detection assembly 202 preferably comprises a layered stack having a dielectric support substrate 212, a conductive electrode array 214 formed onto and overlying the support substrate 212, a dielectric layer 216 overlying the conductive electrode array 214, a photoelectric conversion layer 218 overlying the dielectric layer 216, a top electrode 220, overlying the photoelectric conversion layer 218 and an X-ray sensitive layer 222 overlying the top electrode 220. Preferably, the stack also includes a very thin barrier layer (not shown) disposed at the interface of the photoelectric conversion layer 218 and top electrode 220.

Support substrate 212 provides mechanical support and dimensional stability for detection assembly 202 and may have served as a base upon which subsequent layers 214–222 were formed. In addition, support substrate 212 provides electrical insulation for conductive electrode array 214. Preferably, support substrate 212 is an optically transparent panel, several millimeters thick (approximately 1 mm–5 mm), having a flat, relatively flawless top surface. Support substrate 212 is preferably formed of glass, e.g. Corning glass 7059 and 1737 and Schott AF-45 and Borofloat.

In accordance with alternative embodiments of the present invention, support substrate 212 and overlying layers 214–222 may have a cylindrical drum or concave shape thus providing a concave or drum-shaped detection assembly where relative motion between the concave or drum detection assembly and an elongate optical radiation source is provided by rotation of the concave or drum-shaped detection assembly.

In accordance with a preferred embodiment of the present invention, conductive electrode array 214 comprises a plurality of strip electrodes (not shown) which are preferably planar, elongate and parallel and which end in fan-out regions (not shown).

Conductive electrode array 214 is preferably formed using photolithography and microetching techniques to pattern and segment a generally continuous conductive film which is deposited on a surface of support substrate 212. Alternatively, thermal ablation techniques (e.g. "dry" laser etching) can be used for patterning and segmentation of the conductive film.

The conductive film, which is preferably a transparent indium tin oxide (ITO), is typically deposited on support substrate 212 using conventional vacuum deposition techniques, to provide a uniform layer which is typically 1,000–10,000 angstroms thick.

Alternatively the conductive film may be a thin metallic coating, e.g. aluminum or gold, which is sufficiently thin so as to exhibit a high degree of transparency to optical radiation.

The pitch of adjacent strip electrodes (not shown) of conductive electrode array 214 determines the resolution of detection assembly 202 in one direction as described hereinabove with reference to FIGS. 2A–2B.

Typically, readout electronics, which are described hereinbelow with reference to FIGS. 9–11, are connected to connection fan-out regions (not shown) of conductive electrode array 214 as described hereinabove with reference to FIGS. 2A–2B.

Dielectric layer 216 overlies and electrically insulates conductive electrode array 214. Preferably it fills the gaps between adjacent strip electrodes (not shown).

The material properties desirable for dielectric layer 216 include volume resistivity which is greater than $10^{14}$ ohms/centimeter and which is preferably in the range of $10^{16}$ ohms/centimeter, high dielectric strength (preferably in the range of 50 volts/micron or higher), transparency to optical radiation in the visible spectrum, and suitability to serve as a smooth accepting substrate for subsequent layers.

An example of a suitable material for dielectric layer 216 is silicon dioxide which may be applied using chemical vapor deposition (CV)), vacuum deposition, sol-gel processes or other appropriate techniques.

Preferably, dielectric layer 216 is highly uniform with a thickness in the range of 5–30 microns.

Photoelectric conversion layer 218, which overlies dielectric layer 216, exhibits photoelectric conversion properties—i.e. following exposure to optical photons, the material generates a suitable number of extractable mobile electron hole pairs. In addition, photoelectric conversion layer 218 preferably exhibits high dark resistivity, allowing an electric field to be maintained thereacross for a period of time required for X-ray exposure and reading.

Further desired properties of photoelectric conversion layer 218 are high carrier mobility ($\mu$) and a high carrier lifetime ($\tau$) such that the product of $(\mu p)*(\tau)$ is preferably higher than $10^{-6}$ cm$^2$/V in order to allow fast photodischarge during reading.

It is appreciated that the optical radiation sensitivity required for photoelectric conversion layer 218 and for an X-ray sensitive layer 66 (FIGS. 2A–2B) is similar, and both layers may be formed from the same material. However, photoelectric conversion layer 218 is selected to provide efficient absorption and photogeneration both of optical photons emitted by X-ray sensitive layer 222 and of optical photons emitted by optical radiation source 204, while X-ray sensitive layer 66 (FIGS. 2A–2B), in addition to its sensitivity to optical radiation, must also be sufficiently thick to provide desired stopping power for X-ray photons. Thus, photoelectric conversion layer 218 is typically an order of magnitude thinner than X-ray sensitive layer 66 (FIGS. 2A–2B).

To achieve good detector responsitivity, it is preferable that the capacitance of photoelectric conversion layer 218 be generally equivalent to the capacitance of dielectric layer 216. The thickness of the photoelectric conversion layer 218 is therefore selected accordingly and will typically be in the range of 10–60 microns.

Photoelectric conversion layer 218 may be amorphous selenium, a selenium alloy, amorphous silicon or another inorganic compound having properties as described hereinabove. Alternatively, photoelectric conversion layer 218 may be an organic photoconductor as is known in the art.

The material properties of top electrode 220 are similar to those of conductive electrode array 214 as described hereinabove. Preferably, top electrode 220 is a uniform layer.

An optically transparent barrier layer (not shown) is preferably disposed between top electrode 220 and photoelectric conversion layer 218 to prevent undesirable charge injection into photoelectric conversion layer 218.

X-ray sensitive layer 222, which overlies top electrode 220, is preferably a scintillator—i.e. the material absorbs x-ray radiation and emits optical photons.

Examples of suitable materials for x-ray sensitive layer 222 are cesium iodide doped with thallium and cesium iodide doped with sodium. Typically, cesium iodide is deposited by evaporation to form a structure of needles which are several microns in diameter and several hundred microns long (the thickness of x-ray sensitive layer 222). Use of cesium iodide as a scintillator and deposition thereof in needle form are commonly known in the art.

The needle-like structure provides efficient optical coupling between X-ray sensitive layer 222 and photoelectric conversion layer 218 such that optical radiation emitted as a result of scintillation is efficiently guided directed into the photoelectric conversion layer 218 thereby providing reduced scattering and improved total conversion efficiency from x-ray radiation to charge carriers.

Elongate optical radiation source 204, which may serve as elongate light source 52 (FIGS. 2A–2B), preferably includes a light source assembly 230, an optical enclosure 232, and converging optics 234 in accordance with an alternative embodiment of the invention. Preferably, light source assembly 230 includes a plurality of quasi-point sources as described hereinabove with respect to FIG. 4 and is generally as described hereinabove with reference to light source assembly 74 (FIGS. 2A–2B).

Various cylindrical lens structures (not shown) possible for one-dimensional converging optics 234 are known in the art.

Optical enclosure 232 preferably comprises an elongate facet 236 having an inner reflective surface 238 and an elongate edge 240 which acts as an optical barrier for light emitted from light source assembly 230.

An elongate light beam 241 emitted from light source assembly 230 is first shaped by elongate edge 240 in the Z-Y plane, defining an object plane 242. Beam 241 is then focused by converging optics 234, and finally projected by inner reflective surface 238, through an elongate opening 244 of optical enclosure 232, onto photoelectric conversion layer 218.

The geometrical relationship between light source assembly 230, elongate edge 240, converging optics 234, elongate facet 236, and the optical distance of elongate light beam 241 until impingement on photoelectric conversion layer 218 are selected such that the interface 246 between photoelectric conversion layer 218 and dielectric layer 216 serves as an imaging plane for the object plane 242.

As a result, the shape of elongate light beam 241 as it impinges on photoelectric conversion layer 218 includes at least one sharply defined elongate edge 250, shaped by the elongate edge 240 of optical enclosure 232 and converging optics 234. It should be noted that the width of elongate beam 241 in the x-direction is typically greater than one raster line and may comprise many raster lines.

It is appreciated that use of converging optics 234 in the described embodiment allows delivery of increased radiating power along sharply defined elongate edge 250 of elongate beam 248. Moreover, when passing through the lower optically transparent layers of detection assembly 202, elongate beam 241 undergoes minimal absorption and reflection losses.

It is appreciated that elongate optical radiation source 204 is similar in function and operation to the elongate light source 52 described hereinabove with particular reference to FIGS. 2A–2B and may in fact replace elongate light source 52 (FIGS. 2A–2B) described hereinabove in accordance with an alternative embodiment of the invention.

Similarly, an elongate light source 52 as described hereinabove with particular reference to FIGS. 2A–2B could replace elongate light source 204 in image detection module 200.

The operation of image detection module 200 resembles the operation of image detection module 26 (FIGS. 1–4) and the operation of image detection module 150 (FIGS. 5A–7) as described hereinabove with particular reference to FIGS. 5A–5E.

Prior to exposure, detection assembly 202 is sensitized by creating an electric field across photoelectric conversion layer 218 and dielectric layer 216 by biasing top electrode 220 to a first bias voltage, typically 400–800 volts, and by biasing conductive electrode array 214 to ground potential. Since photoelectric conversion layer 218 is relatively thin, the first bias voltage required to create a suitable electric field for sensitizing photoelectric conversion layer 218 is relatively low in comparison to the bias voltage $V_{DC1}$ required for the configuration of FIGS. 5A–7.

After sensitizing, detection assembly 202 is exposed to incident radiation 206 representing an x-ray image.

Generation of charge carriers occurs in photoelectric conversion layer 218 in response both to "direct" interaction with x-ray radiation and "indirectly" through interaction with optical radiation emitted and directed downwards into photoelectric conversion layer 218 by the X-ray sensitive layer 222 following interaction therein with X-ray radiation. According to the present embodiment, the X-ray imaging radiation is mainly absorbed by X-ray sensitive layer 222 and partially absorbed by photoelectric conversion layer 218.

The proportion of X-ray radiation absorbed by each layer, and thus the amount of charge carriers generated "directly" and those generated "indirectly", is determined by the X-ray sensitivity and thickness of photoelectric conversion layer 218 and the X-ray sensitivity and thickness of the X-ray sensitive layer 222.

To enable efficient optical coupling of scintillation radiation to photoelectric conversion layer 218, top electrode 220 is preferably optically transparent and as thin as possible providing high transmission and low reflection of optical radiation.

The charge pattern created as a result of X-ray absorption is retained at the interface between the photoelectric conversion layer 218 and dielectric layer 216 and a tracking charge pattern replica is generated in conductive electrode array 214. The replica is caused by replica forces according to the same mechanism as described in FIGS. 5A–6B.

Figure 5E:
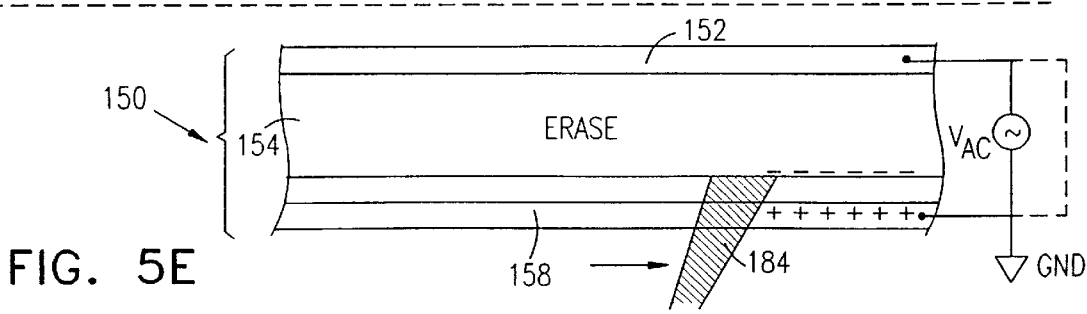

The charge pattern replica is read and detection assembly 202 is prepared for subsequent exposure cycles according to the techniques and principles of operation described hereinabove with reference to FIGS. 5D–5E.

Reference is now made to FIGS. 9–11 which illustrate readout electronics 300 which may be used in accordance with an X-ray image detection assembly as described hereinabove. FIGS. 9 and 10 are schematic electrical circuit diagrams of readout electronics 300 connected to conductive electrodes 301 of a detection assembly as described hereinabove.

Also shown is elongate light source 308 which generally transverses conductive electrodes 301 and which may be of the type described hereinabove.

It is appreciated that conductive electrodes 301 may serve as the strip electrodes 72 of conductive electrode array 62 (FIGS. 2A–4) or as the conductive electrodes of conductive electrode array 158 (FIGS. 5A–5E) or as the conductive electrode array 214 (FIG. 8).

FIG. 11 is a timing diagram of the signals associated with readout electronics 300. These signals may be supplied by a system controller (not shown).

It is appreciated that the circuits described herein represent one embodiment of readout electronics 300. Alternative circuit embodiments capable of high speed, parallel reading of small signals with minimal noise may be used as an alternative to the circuits described in connection with FIGS. 9 and 10.

Readout electronics 300 which may serve as readout electronics 160 of FIGS. 5D, are used to read a charge pattern representing an X-ray image retained by an X-ray image detector following exposure to X-ray radiation as described herein.

Typically, a charge pattern to be read comprises an m x n pixel matrix, where m is a fixed number corresponding to the number of conductive electrodes 301 and n is determined by the read sampling frequency. For example, it is a particular feature of the present invention that reading of an 14"×17" X-ray image comprising as many as 30,0,000 pixels can be accomplished in seconds and preferably in less than one second.

Charge patterns are read by measuring the current which flows during a read cycle between conductive electrodes 301 and ground 310. The measured current is translated to electrical signals thus providing "reading" of a charge image associated with conductive electrodes 301 and creating an electrical signal representation thereof.

Readout electronics 300 include a plurality of multi-channel analog circuits 312 and a plurality of multi-channel digital circuits 314. Typically the number of channels of multi-channel circuits 312 and 314 is equal to the number of conductive electrodes 301, with each electrode connected to a single channel.

Typically, each input channel of multi-channel analog circuit 312 includes a reader 316. Reader 316 measures input current and provides a pulse-width modulated (PWM) output signal, corresponding to the current integrated over a predefined period of time T (i.e. total charge flowing) associated with the read sampling frequency. Reader 316 is described hereinbelow with reference to FIG. 10.

The PWM signal output by reader 316 is input to a corresponding converter 318 of multi-channel digital circuit 314. Converter 318 is described hereinbelow with reference to FIG. 10.

Converter 318 converts the PWM signal to multi-bit digital data which is output to a data bus 320 in synchronization provided by a multiplexer 322.

Thus, readout electronics 300 provides a parallel conversion from small-signal analog information to multi-bit serial digital data.

According to a preferred embodiment of the present invention illustrated in FIG. 9, each multi-channel analog circuit 312 is realized in an individual Application Specific Integrated Circuit (ASIC) and each multi-channel digital circuit 314 is realized in an individual digital ASIC.

In accordance with an alternative embodiment of the invention, the analog and digital ASICS may be integrated into a single ASIC. However, in order to enhance the signal to noise ratio of readout electronics 300, it is preferable to provide distinct analog ASICs and digital ASICs. Preferably, and in order to effectively achieve the parallel to serial data conversion, the digital ASICs are cascadable.

Multi-channel analog circuit 312 and multi-channel digital circuit 314 can be better understood by referring to FIG. 10 which schematically illustrates the operation of reader 316 and converter 318 for a single channel.

A transimpedance amplifier 324 serves as an impedance buffer for conductive electrodes 301. Current entering reader 316 flows through transimpedance amplifier 324 to ground 310 which converts the signal current to a corresponding amplified voltage signal.

The amplified voltage signal is filtered by a filter 326 which limits the bandwidth of signal detection thus rejecting a high level of noise while preserving the signal information, thereby improving the signal to noise ratio.

The filtered signals are integrated over time by an integrator 328 to provide a value which corresponds to the total current flowing through a channel during time T, associated with the read sampling frequency. Time T is established by consecutive reset signals R input to integrator 328.

Integrating the filtered signals at integrator 328 allows accumulation of momentary signal values, thus enhancing the signal, while random noise interference is averaged out. This further improves the signal to noise ratio.

Upon activation by means of a sample actuation signal S, the value output by integrator 328 is sampled by a sample and hold circuit 332. The resulting sampled value is then applied to a comparator 334 for comparison to a ramp signal. As a result of the comparison, comparator 334 outputs a pulse width modulated signal PWM corresponding to the level of the sampled value.

Converter 318 receives the PWM signal and converts it into digital data with a predefined depth (e.g. 8–14-bit). The digital data value is output to data bus 320. Typically, each converter 318 includes a counter 336 and a data latch 338.

During each read time cycle $T_n$, m pixels are read in parallel (one pixel per conductive electrode 301) corresponding to one raster line of the charge pattern to be read.

Read cycle $T_n$, which is shown in FIG. 11, typically has a duration which is greater than 100 microseconds, is as follows:

Signal LA is given to elongate light source 308, collectively activating the LED's of reading array 106 (FIG. 4) for a duration which generates a suitable electron/hole pairs to eventually cause regional discharge and neutralization of X-ray sensitive layer 154 (FIGS. 5A–5E). It is appreciated that discharge and neutralization are not completed during signal LA. Instead, during the remainder of cycle $T_n$, prior to sample and hold activation, transit of generated mobile holes through X-ray sensitive layer 154 to complete neutralization and discharge is carried out. A typical transit time for mobile holes in a 500 micron layer of amorphous selenium is several tens of microseconds.

At the beginning of the cycle, signal E enables comparator 334 and counter 336 and the ramp signal starts ramping up towards its maximum value.

Comparator 334 outputs a "high" PWM signal and counter 336 counts up the clocks of signal CC. When the ramp signal becomes equal to the sampled signal value, the PWM signal drops to a "low" state and counter 336 ceases counting.

When the PWM signal is "low", counter 336 maintains a count value (8–14-bit) corresponding to the duration of the "high" PWM signal.

Towards the end of cycle $T_n$, Sample actuation signal S causes sample and hold circuit 332 to sample the value of Pixel n and causes data latch 338 to sample and store the count value of counter 336 for Pixel n−1.

Enable signal E is then disabled and ramp signal drops to its minimum value in preparation for a subsequent comparison.

Following activation by sample actuation signal S, reset signal R is given to counter 336 and integrator 328, resetting them in preparation for subsequent analog signal sampling and digital conversion.

Typically, plurality of multi-channel digital circuits 314 are cascaded together. Each multi-channel digital circuit 314 is selected by a chip select input signal CSI to sequentially transfer data loaded in data latches 338 to data bus 320 using clocks provided by shift clock signal SC (FIG. 9).

When the last data latch 338 has transferred its data to data bus 320, a chip select output signal CSO is provided by multi-channel digital circuit 314. The CSO serves as the CSI signal for a subsequent multi-channel digital circuit 314 in the cascade.

The chip selection process continues until each multi-channel digital circuit 314 in the cascade has sequentially output the data stored in its data latches 338 to data bus 320.

Each complete CSI/CSO cycle over the cascade, provides multi-bit digital data on data bus 320 sequentially from m channels representing one raster line of an image to be read.

The CSI signal to the first multi-channel digital circuit 314 in the cascade occurs immediately after sample actuation signal S has enabled the transfer of data from each counter 336 to each data latch 338.

Thus, during each cycle $T_n$ the following occurs at each of the m channels:

Data for pixel n is integrated and sampled.

Sampled analog data for pixel n−1 is converted to digital data and stored.

Stored digital data for pixel n−2 is sequentially transferred to data bus 320 from each of the m channels.

It will be appreciated by persons skilled in the art that the present invention is not limited by what has been described above. The scope of the present invention includes both combinations and sub-combinations of the various features described hereinabove as well as modifications and additions thereto which would occur to a person skilled in the art upon reading the foregoing disclosure and which are not in the prior art.

What is claimed is:

1. A radiation detection module comprising:
   a generally uniform dielectric layer having generally opposite first and second surfaces;
   a conductive layer interfacing the first surface of the generally uniform dielectric layer;
   an ionizing radiation detection multi-layer structure including a photoelectric conversion layer within said photoelectric conversion layer interfaces the second surface of said generally uniform dielectric layer;
   said ionizing radiation detection multi-layer structure, said generally uniform dielectric layer, and said conductive layer being configured with respect to each other and being operative such that an imagewise ionizing radiation pattern impinging on said ionizing radiation detection multi-layer substrate causes a corresponding charge pattern representing said imagewise ionizing radiation pattern to be generated at the interface between the generally uniform dielectric layer and the photoelectric conversion layer and causes a readable imagewise replica of said charge pattern to be formed in said conductive layer; and
   readout electronics for reading out said readable imagewise replica.

2. A radiation detection module according to claim 1 and wherein the photoelectric conversion layer of said ionizing radiation detection multi-layer structure converts ionizing and optical radiation to charge carriers and wherein the ionizing radiation detection multi-layer structure also includes a continuous electrode disposed over the photoelectric conversion layer.

3. A radiation detection module according to claim 2 and wherein the ionizing radiation detection multi-layer structure comprises a barrier layer disposed between said continuous electrode and said photoelectric conversion layer.

4. A radiation detection module according to claim 2 and wherein the photoelectric conversion layer is at least one of selenium and a selenium alloy.

5. A radiation detection module according to claim 2 and wherein the photoelectric conversion layer is a material selected from the group consisting of lead oxide, thallium bromide, cadmium telluride, cadmium zinc telluride, cadmium sulfide, and mercury iodide.

6. A radiation detection module according to claim 2 and wherein the ionizing radiation detection multi-layer structure also includes:
   a scintillator, which absorbs ionizing radiation and emits optical radiation, disposed over said continuous electrode and wherein said continuous electrode is generally transparent to optical radiation.

7. A radiation detection module according to claim 6 and wherein the ionizing radiation detection multi-layer structure also comprises an optically transparent barrier layer disposed between the continuous electrode and the photoelectric conversion layer.

8. A radiation detection module according to claim 6 and wherein the scintillator is one of the group that includes cesium iodide and doped versions thereof.

9. A radiation detection module according to claim 6 and wherein the photoelectric conversion layer is at least one of amorphous selenium, a selenium alloy and amorphous silicon.

10. A radiation detection module according to claim 6 and wherein the photoelectric conversion layer is an organic photoconductor.

11. A radiation detection module according to claim 1 and also including an optical radiation source which scans at least part of the conductive layer and wherein the conductive layer and the generally uniform dielectric layer are generally transparent to optical radiation.

12. A radiation detection module according to claim 11 and wherein the optical radiation source includes at least one first source of optical radiation which impinges on but does not pass entirely through the photoelectric conversion layer.

13. A radiation detection module according to claim 12 and wherein said optical radiation source also includes at least one second source of optical radiation which generally passes through the photoelectric conversion layer.

14. A radiation detection module according to claim 11 and wherein the optical radiation source includes a generally linear array of light emitting diodes.

15. A radiation detection module according to claim 11 and wherein the optical radiation source emits a generally elongate beam of optical radiation.

16. A radiation detection module according to claim 15 and wherein the generally elongate beam of optical radiation has at least one well-defined elongate edge.

17. A radiation detection module according to claim 11 and also comprising readout electronics coupled to said conductive layer for sensing electrical currents, corresponding to a charge pattern distributed therein, during an operative scan of the optical radiation source over at least part of the conductive layer.

18. An image detection module according to claim 17 wherein said readout electronics are removably coupled to said conductive layer.

19. An image detection module according to claim 17 wherein said readout electronics are permanently coupled to said conductive layer.

20. An image detection module according to claim 1 wherein said ionizing radiation is x-ray radiation.

21. An addressable array of radiation detection elements comprising:
- a multi-layer radiation sensor;
- a plurality of electronically addressable, optically transparent conductive columns associated with the multi-layer radiation sensor;
- readout electronics coupled to said conductive columns; and
- a scanning source of optical radiation, projecting an elongate beam transversing said conductive columns, said elongate beam having a width that is generally wider than one row, and wherein said elongate beam scans the conductive columns, providing sequential row addressing of the array of radiation detection elements.

22. An addressable array of radiation detection elements according to claim 21 and wherein the radiation to be detected is ionizing radiation.

23. An addressable array of radiation detection elements according to claim 22 and wherein the ionizing radiation is x-ray radiation.

24. An addressable array of radiation detection elements according to claim 21 and wherein the multi-layer radiation sensor comprises:
- a continuous electrode;
- a generally transparent dielectric layer; and
- a photoelectric conversion layer disposed between said continuous electrode and said generally transparent dielectric layer.

25. An addressable array of radiation detection elements according to claim 22 and wherein the multi-layer radiation sensor comprises a barrier layer disposed between said continuous electrode and said photoelectric conversion layer.

26. An addressable array of radiation detection elements according to claim 21 and wherein the a photoelectric conversion layer is one of selenium and a selenium alloy.

27. An addressable array of radiation detection elements according to claim 21 and wherein the a photoelectric conversion layer comprises material selected from the group consisting of lead oxide, thallium bromide, cadmium telluride, cadmium zinc telluride, cadmium sulfide, and mercury iodide.

28. An addressable array of radiation detection elements according to claim 21 and wherein the radiation to be detected is ionizing radiation and wherein the multi-layer radiation sensor is a layered stack having the following order:
- a scintillator;
- a generally transparent continuous electrode;
- a photoelectric conversion layer; and
- a generally transparent dielectric layer.

29. An addressable array of radiation detection elements according to claim 28 and wherein the multi-layer radiation sensor comprises an optically transparent barrier layer disposed between said generally transparent continuous electrode and said photoelectric conversion layer.

30. An addressable array of radiation detection elements according to claim 28 and wherein the scintillator includes one of cesium iodide and a doped version thereof.

31. An addressable array of radiation detection elements according to claim 28 and wherein the photoelectric conversion layer is at least one of amorphous selenium, a selenium alloy and amorphous silicon.

32. An addressable array of radiation detection elements according to claim 28 and wherein the photoelectric conversion layer is an organic photoconductor.

33. A method for radiation detection comprising:
- providing a generally uniform dielectric layer having generally opposite first and second surfaces, a conductive layer interfacing the first surface of the generally uniform dielectric layer, and an ionizing radiation detection multi-layer structure having a photoelectric conversion layer interfacing the second surface of the generally uniform dielectric layer;
- causing an imagewise ionizing radiation pattern;
- configuring said ionizing radiation detection multi-layer structure, said generally uniform dielectric layer, and said conducive layer with respect to each other and operating them such that imagewise ionizing radiation pattern impinging on said ionizing radiation detection multi-layer structure causes a corresponding charge pattern representing said imagewise ionizing radiation pattern to be generated at the interface between the photoelectric conversion layer and the dielectric layer and causes a readable imagewise replica of said charge pattern to be formed in said conductive layer; and
- reading out said readable imagewise replica formed in said conductive layer.

34. A method for radiation detection according to claim 33 and wherein the step of reading out comprises causing an optical radiation source to scan over at least part of said conductive layer.

35. A method for radiation detection according to claim 34 and wherein said step of reading out comprises using readout electronics coupled to said conductive layer for sensing an electric current flowing therealong as said optical radiation source scans over said conductive layer.

36. A method for radiation detection according to claim 33 and wherein the step of reading comprises the step of uniformization of the charge pattern at the interface between the photoelectric conversion layer and the dielectric layer.

37. A method for radiation detection according to claim 36 wherein the step of uniformization is carried out sequentially on raster lines of the charge pattern.

38. A method for radiation detection according to claim 33 wherein the imagewise ionizing radiation is x-ray radiation.

39. A method for radiation detection employing an addressable array of radiation detection elements, the method comprising:

providing a multi-layer radiation sensor and a plurality of electronically addressable optically transparent conductive columns associated with the multi-layer radiation sensor and readout electronics coupled to said conductive columns and employing a scanning source of optical radiation to project an elongate beam transversing said optically transparent conductive columns, said beam having a width that is generally wider than one row, and wherein said beam scans the conductive columns, providing sequential addressing of each row of the array of radiation detection elements, thereby detecting said radiation via said readout electronics.

40. A method for radiation detection employing an addressable array of radiation detection elements according to claim 39 wherein the radiation to be detected is ionizing radiation.

41. A method for radiation detection employing an addressable array of radiation detection elements according to claim 40 wherein the ionizing radiation to be detected is x-ray radiation.

* * * * *